United States Patent
Tsutsui et al.

(10) Patent No.: US 6,794,996 B2
(45) Date of Patent: Sep. 21, 2004

(54) CONTENT SUPPLY SYSTEM AND INFORMATION PROCESSING METHOD

(75) Inventors: Kyoya Tsutsui, Tokyo (JP); Kenzo Akagiri, Tokyo (JP); Tadao Yoshida, Tokyo (JP); Naoya Haneda, Tokyo (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 10/239,848

(22) PCT Filed: Feb. 8, 2002

(86) PCT No.: PCT/JP02/01105

§ 371 (c)(1),
(2), (4) Date: Apr. 1, 2003

(87) PCT Pub. No.: WO02/065448

PCT Pub. Date: Aug. 22, 2002

(65) Prior Publication Data

US 2003/0169821 A1 Sep. 11, 2003

(30) Foreign Application Priority Data

| Feb. 9, 2001 | (JP) | ................................ P2001-034596 |
| Feb. 9, 2001 | (JP) | ................................ P2001-034598 |
| Apr. 27, 2001 | (JP) | ................................ P2001-133605 |

(51) Int. Cl.[7] .............................................. H03M 7/00
(52) U.S. Cl. ......................... 341/50; 714/758; 341/173
(58) Field of Search .................. 341/173, 50; 714/758; 380/46; 375/240.23; 704/230

(56) References Cited

U.S. PATENT DOCUMENTS 5,852,469 A * 12/1998 Nagai et al. ............. 375/240.23
6,353,807 B1 * 3/2002 Tsutsui et al. ............... 704/230
6,480,123 B2 * 11/2002 Tsutsui et al. ................ 341/50
6,501,801 B2 * 12/2002 Chujoh et al. .......... 375/240.23

FOREIGN PATENT DOCUMENTS

| JP | 7-111497 | 4/1995 |
| JP | 8-8852 | 1/1996 |
| JP | 8-228332 | 9/1996 |
| JP | 10-135944 | 5/1998 |
| JP | 10-257045 | 9/1998 |
| JP | 11-220717 | 8/1999 |
| JP | 11-250145 | 9/1999 |
| JP | 11-259067 | 9/1999 |
| JP | 2000-123481 | 4/2000 |
| JP | 2000-183835 | 6/2000 |
| JP | 2000-196585 | 7/2000 |
| JP | 2000-285174 | 10/2000 |
| JP | 2001-325460 | 11/2001 |
| JP | 2002-14683 | 1/2002 |
| JP | 2002-62882 | 2/2002 |

* cited by examiner

Primary Examiner—Jean Bruner Jeanglaude
(74) Attorney, Agent, or Firm—Oblon, Spivak, McClelland, Maier & Neustadt, P.C.

(57) ABSTRACT

A center (content supply center) (1865) for storing and managing contents, and user terminals (1861 to 1864) used by respective users are connected via networks (861 to 867). The center (1865) sends signals of contents for trial viewing/listening to the user terminals for free or at a low price. The user terminals (1861 to 1864) can receive the signals of the contents for trial viewing/listening and select and purchase only the content that the user likes from the received contents so as to reproduce the content with high quality. This enables trial viewing/listening. It is not necessary to download a large quantity of data with high quality from the content supply center or the like and there will be more opportunities of content purchase.

24 Claims, 27 Drawing Sheets

US 6,794,996 B2

CONTENT SUPPLY SYSTEM AND INFORMATION PROCESSING METHOD

TECHNICAL FIELD

This invention relates to a content supply system and an information processing method for supplying contents such as audio signals or image signals, and particularly to a content supply system and an information processing method in which signals are coded to enable trial viewing/listening and therefore reproduction and recording with high quality is made possible by adding a small quantity of data when a trial viewer/listener decides to purchase the signals.

BACKGROUND ART

A content (software) distribution method is known in which, for example, an acoustic signal or the like is encrypted and then broadcast or recorded to a recording medium so that only a person who purchased a key for decryption is permitted to listen to the signal.

As an encryption method, for example, a method is known in which an initial value of a random-number sequence is given as a key signal for a bit string of a PCM acoustic signal and then a bit string obtained by taking an exclusive OR between the generated random-number sequence of 0/1 and the PCM bit string is transmitted or recorded to a recording medium. As this method is used, a person who acquired the key signal can correctly reproduce the acoustic signal and a person who did not acquire the key signal can only reproduce noise. Of course, it is also possible to use a more complicated method such as so-called DES (Data Encryption Standard) as an encryption method. Description of the DES standard is disclosed in "Federal Information Processing Standards Publication 46, Specifications for the DATA ENCRYPTION STANDARD, 1977, January 15."

On the other hand, a method for compressing an acoustic signal and then broadcasting or recording the compressed acoustic signal to a recording medium is popularized, and recording media which enable recording of a coded audio signal or the like, such as a magneto-optical disc, are broadly used.

There are various techniques for high-efficiency coding of an audio signal, voice signal, or the like. For example, such techniques may include subband coding (SBC), which is a non-blocked frequency band division system for dividing an audio signal or the like on the time axis into a plurality of frequency bands without blocking and then coding the band-divided audio signal, and so-called transform coding, which is a blocked frequency band division system for transforming (spectrally transforming) a signal on the time axis to a signal of the frequency axis, then dividing the signal into a plurality of frequency bands and coding the signal of each band. Moreover, a high-efficiency coding technique combining the above-described subband coding with transform coding is considered. In that case, for example, after frequency band division is carried out by the above-described subband coding, the signal of each band is spectrally transformed to a signal on the frequency axis and the spectrally transformed signal of each band is coded.

As a filter for the above-described technique, for example, a QMF filter is used. The QMF filter is described in "R. E. Crochiere, Digital coding of speech in subbands, Bell Syst. Tech. J. Vol.55, No.8, 1976." Moreover, a filter division technique with equal bandwidth is disclosed in "Joseph H. Rothweiler, Polyphase Quadrature Filters—A new subband coding technique, ICASSP 83, BOSTON."

As the above-described spectral transform, for example, the time axis is transformed to the frequency axis by blocking an input audio signal by predetermined unit time (frame) and then performing discrete Fourier transform (DFT), discrete cosine transform (DCT), modified discrete cosine transform (MDCT) or the like on each of the blocks. MDCT is described in "J. P. Princen, A. B. Bradley, Univ. of Surrey Royal Melbourne Inst. of Tech., Subband/Transform Coding Using Filter Band Designs Based on Time Domain Aliasing Cancellation, ICASSP, 1987".

If the above-described DFT or DCT is used as a method for transforming a waveform signal to the spectrum, M independent real-number data are provided by performing transform on a time block consisting of M samples. To reduce the connection distortion between time blocks, each time block is usually overlapped with both adjacent blocks by M1 samples each. Therefore, on average, M real-number data are quantized and coded for (M-M1) samples in DFT or DCT.

On the other hand, if the above-described MDCT is used as a method for transforming a waveform signal to the spectrum, M independent real-number data are provided from 2M samples as a result of overlapping both adjacent time blocks by M samples each. Therefore, on average, M real-number data are quantized and coded for M samples in MDCT. A decoding device can reconstruct the waveform signal by performing inverse transform on each block of the code obtained by using MDCT and then adding the resulting waveform elements while letting them interfere with each other.

Generally, by elongating a time block for transform, the frequency resolution of the spectrum is enhanced and the energy concentrates at a specific spectral component. Therefore, by using MDCT in which each block is overlapped with both adjacent blocks by half each to perform transform with a longer block length and in which the number of resulting spectral signals is not increased from the number of the original time samples, more efficient coding can be carried out than when DFT or DCT is used. Moreover, by having each block have a sufficient long overlap with the adjacent blocks, the distortion between the blocks of the waveform signal can be reduced.

By quantizing the signal thus divided to each band by the filter or spectral transform, a band where quantization noise is generated can be controlled and more auditorily efficient coding can be performed by utilizing characteristics such as masking effect. By carrying out normalization for each band with the maximum value of absolute values of signal components in the band before performing quantization, more efficient coding can be performed.

The frequency division width in the case of quantizing each frequency component obtained by frequency band division is determined, for example, in consideration of the human auditory characteristic. Specifically, an audio signal may be divided into a plurality of bands (for example 25 bands) with broader bandwidths for higher-frequency bands which are generally called critical bands. When coding data of each band in this case, coding is carried out by using predetermined bit distribution to each band or adaptive bit allocation to each band. For example, when coding coefficient/factor data resulting from the above-described MDCT processing by the above-described bit allocation, the MDCT coefficient/factor data of each band resulting from MDCT of each of the blocks is coded by using an adaptive number of allocated bits.

For such bit allocation, the following two techniques are known. Specifically, "R. Zelinski and P. Noll, Adaptive Transform Coding of Speech Signals, IEEE Transactions of Acoustics, Speech, and Signal Processing, vol.ASSP-25, No.2, August 1977", discloses bit allocation based on the magnitude of a signal of each band. In this system, though the quantization noise spectrum is flat and the noise energy is minimum, the actual perception of noise is not optimum because the auditory masking effect is not utilized. "M. A. Kransner, MIT, The critical band coder—digital encoding of the perceptual requirements of the auditory system, ICASSP 1980", discloses a technique in which a necessary signal-to-noise ratio for each band is obtained using auditory masking, thus performing fixed bit allocation. With this technique, however, even when measuring characteristics by using a sine wave input, a satisfactory characteristic value is not obtained because of fixed bit allocation.

To solve these problems, a high-efficiency coding device is proposed in which all the bits that can be used for bit allocation are divisionally used for a fixed bit allocation pattern predetermined for each small block and for bit allocation dependent on the magnitude of the signal of each block and in which the division ratio depends on a signal related to the input signal so that the proportion of division to the fixed bit allocation pattern is increased for a smoother spectrum of the signal.

According to this technique, if the energy concentrates at a specific spectrum, as in a sine wave input, the signal-to-noise ratio can be significantly improved as a whole by allocating many bits to a block containing that spectrum. Generally, since the human auditory sense is very sensitive to a signal having an acute spectral component, the improvement in the signal-to-noise ratio by using this technique is effective not only for improvement in the numerical value in measurement but also for improvement in the sound quality perceived by the auditory sense.

Many other techniques for bit allocation are proposed. As the auditory model is elaborated further and the coding device has a sufficient capability, more auditorily efficient coding is made possible. In these techniques, typically, a bit allocation reference value of a real number which realizes the signal-to-noise characteristic found by calculation with high fidelity is found, and an integer which approximates the reference value is used as the number of allocated bits.

In the specification and drawings of the Japanese Patent Application No.H5-152865 or WO94/28633 proposed by the present inventors, a method is proposed in which a tonal component that is particularly important in terms of the auditory sense, that is, a signal component with energy concentrated around a specific frequency, is separated from a spectral signal and coded separately from the other spectral components. This enables efficient coding of an audio signal etc. at a high compression rate while causing little auditory deterioration.

To construct an actual code string, first, quantization accuracy information and normalization factor (coefficient) information may be coded using a predetermined number of bits for each band on which normalization and quantization are performed, and then a normalized and quantized spectral signal may be coded. Moreover, the ISO/IEC 11172-3:1993 (E), 1993 describes a high-efficiency coding system in which the number of bits representing quantization accuracy information is set to vary depending on the band. It is standardized that the number of bits representing quantization accuracy information is decreased toward higher frequency bands.

Instead of directly coding quantization accuracy information, a method is known in which quantization accuracy information is decided from normalization factor information in a decoding device. In this method, however, the relation between normalization factor information and quantization accuracy information is decided when the standard is set. Therefore, control of the quantization accuracy based on a more advanced auditory model cannot be introduced in the future. Moreover, if the compression rate to be realized is variable, the relation between normalization factor information and quantization accuracy information must be defined for each compression rate.

There is also known a method for more efficient coding by coding a quantized spectral signal using a variable-length code described in "D. A. Huffman, A Method for Construction of Minimum Redundancy Codes, Proc. I.R.E., 40, p.1098 (1952)".

Meanwhile, a software distribution method is known in which an acoustic signal or the like coded by the above-described methods is encrypted and broadcast or recorded to a recording medium so that only a person who purchased a key is permitted to listen to the signal. As an encryption method, for example, a method is known in which an initial value of a random-number sequence is given as a key signal for a bit string of a PCM (pulse code modulation) acoustic signal or a coded signal and then a bit string obtained by taking an exclusive OR between the generated random-number sequence of 0/1 and the bit string is transmitted or recorded to a recording medium. As this method is used, only a person who acquired the key signal can correctly reproduce the acoustic signal and a person who did not acquire the key signal can only reproduce noise. Of course, it is also possible to use a more complicated method as an encryption method.

However, such a method has a problem that a user must first decide to purchase a content and then download a large quantity of data with high quality from a content supply center or the like.

There is another problem that a user must necessarily access the content supply center or the like in order to carry out trial viewing/listening and hence there will be less opportunities of trial viewing/listening.

Moreover, in the case of music or the like, a user often wants to purchase a tune selected from tunes which the user happens to listen to. However, in the method of accessing the center to select trial viewing/listening, there is a problem that the user will be at a loss about which tune to select for trial listening.

DISCLOSURE OF THE INVENTION

In view of the foregoing status of the art, it is an object of the present invention to provide a content supply system and an information processing method which enable trial viewing/listening, eliminate the need to download a large quantity of data with high quality from a content supply center or the like, and enable increase in the number of opportunities of content purchase.

In order to solve the foregoing problems, a content supply system according to the present invention comprises: a content supply center for supplying a signal of a first code string in which a part of information of a code string obtained by coding a content is replaced by dummy data and a signal of a second code string for complementing the dummy data part; and a user terminal having a function to arbitrarily receive the data of the first code string from the content supply center, to receive the signal of the second code string from the content supply center in accordance with a predetermined condition, and to replace the dummy data of the first code string by using the second code string.

Thus, it is no longer necessary to download a large quantity of data with high quality after deciding to purchase the content.

Moreover, a content supply system according to the present invention comprises a content supply center for sending signals of contents for trial viewing/listening to a user terminal for free or at a low price, a user being able to receive the contents for trial viewing/listening from the content supply center and to select and purchase only the content that the user likes from the received contents so as to reproduce the content with high quality.

Thus, since the data for trial viewing/listening is automatically sent from the center, the user need not access the center for trial viewing/listening and there will be more opportunities of trial viewing/listening.

Moreover, a content supply system according to the present invention permits copying of signals of contents for trial viewing/listening acquired by one user, for free or at a low price, and enables each user who reproduced the copy to select and purchase only the content that each user likes from the reproduced copy so as to reproduce the content with high quality.

Thus, since the trial viewing/listening data is transmitted between the users, there will be more opportunities of trial viewing/listening.

Furthermore, a content supply system according to the present invention enables a user to record signals of contents for trial viewing/listening downloaded from a content supply terminal for free or at a low price, reproduce the signals of these contents, and select and purchase only the content that the user likes from them so as to reproduce the content with high quality.

Thus, since the trial viewing/listening data is transmitted between the users, there will be more opportunities of trial viewing/listening.

The signals of the contents for trial viewing/listening have a narrow reproducing band. The narrowing of the reproducing band is realized by embedding dummy data into the code string of the content or by encrypting a part of the code string.

Moreover, according to the present invention, since a user more often purchases a music tune selected from tunes which the user happens to listen to, the user will not be at a loss about which tune to select for trial listening and there will be more opportunities of content purchase.

Furthermore, an information processing method according to the present invention comprises: a step of generating, from an original code string obtained by coding original information by a predetermined format with a frame structure, a first code string which can be reproduced as information having lower quality than the original information but recognizable by a human being, by replacing a part or a plurality of parts of the original code string with dummy data; a step of generating a second code string which enables reproduction of the original information by complementing the first code string, from the part or the plurality of parts of the original code string separated from the first code string; a step of supplying the first code string to first information supply means; a step of supplying the second code string to the first information supply means or second information supply means; a step of distributing the first code string through the first information supply means so that at least a part of the first code string is in an access-free status; a step of distributing the second code string through the first information supply means or the second information supply means so that at least a part of the second code string is in a non-access-free status; a step of reproducing the information having lower quality than the original information but recognizable by a human being from the first code string, by using information reproducing means capable of reproducing the code string coded by the predetermined format; and a step of accessing the second code string through predetermined processing and reproducing the information from the first code string while complementing the first code string with the second code string.

The part or the plurality of parts of the code string to be replaced by the dummy data may include, for example, a part or all of content information and/or a part or all of control information necessary for reproduction of the content information. Moreover, the part or the plurality of parts of the code string to be replaced can be set to a part or all of frames. Furthermore, the predetermined format may be a format for generating a code string, for example, by variable-length coding the content information and multiplexing it as a code string related to control information necessary for reproduction of the content information.

The access-free status means that an unspecified person can normally access the code string. That is, the access-free status includes not only the status where no access limitation is set on the code string but also the status where the code string is practically access-free though an access limitation that can be easily canceled by an unspecified person is set. The non-access-free status means that only a specified person can normally access the code string.

The distribution in the non-access-free status can be realized, for example, by performing encryption processing on the code string and then distributing the code string. In this case, the user cannot access the code string unless he/she carries out decryption processing as predetermined processing.

Moreover, the distribution in the non-access-free status can be realized, for example, by recording the code string to a copy-protected storage medium and physically distributing the storage medium. In this case, free access to the code string by the user for a predetermined period may be permitted by utilizing a digital watermarking technique, a time limitation technique and the like.

In any of the above-described methods for realizing the distribution in the non-access-free status, it is possible to employ such a structure that execution of the corresponding predetermined processing by the user is permitted on the assumption of appropriate accounting, registration of user information, distribution of advertising information to the user or confirmation of advertising information by the user, and so on. Alternatively, in any of the above-described methods for realizing the distribution in the non-access-free status, it is possible to employ such a structure that free execution of the predetermined processing by the user within a predetermined period is permitted but free execution of the predetermined processing by the user is not permitted after the predetermined period unless appropriate processing is carried out.

BEST MODE FOR CARRYING OUT THE INVENTION

Prior to the description of embodiments of the present invention, an optical recording/reproducing device as a typical compressed data recording/reproducing device used for the description of the embodiments of the present invention will be first described with reference to the drawings.

Figure 1:
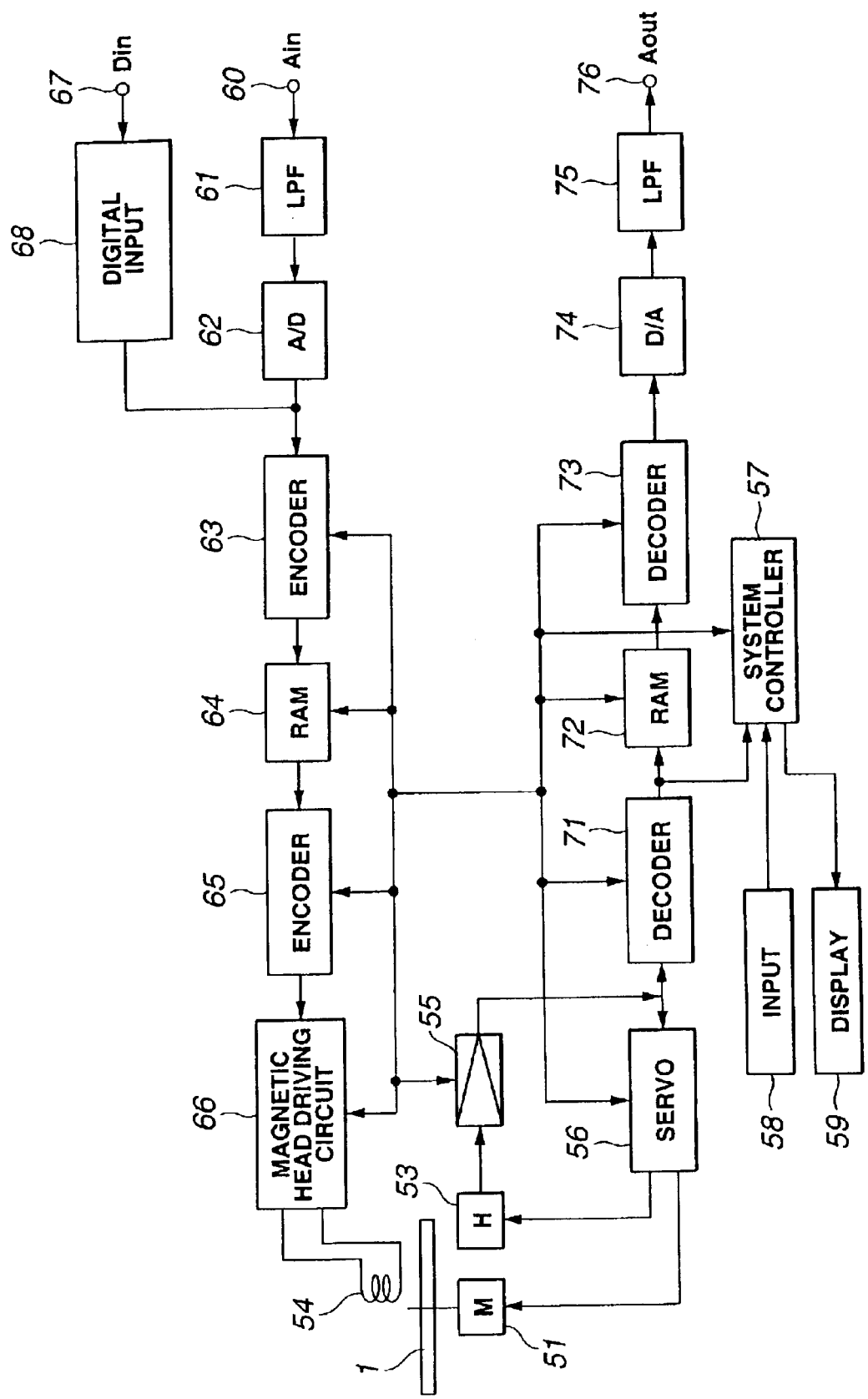
FIG. 1 is a block diagram showing a schematic structure of an optical disc recording/reproducing device used for description of an embodiment of the present invention.

FIG. 1 is a block diagram showing an exemplary optical disc recording/reproducing device. In the device shown in FIG. 1, first, a magneto-optical disc 1 rotationally driven by a spindle motor 51 is used as a recording medium. When recording data to the magneto-optical disc 1, for example, a modulation magnetic field corresponding to the data to be recorded is applied by a magnetic head 54 while a laser beam is cast by the optical head 53, thus performing so-called magnetic field modulation recording so as to record the data along recording tracks of the magneto-optical disc 1. When reproducing data, the recording tracks of the magneto-optical disc 1 are traced by a laser beam from the magnetic head 53, thus performing magneto-optical reproduction.

The optical head 53 is constituted by, for example, a laser light source such as a laser diode, optical components such as a collimating lens, an objective lens, a polarizing beam splitter and a cylindrical lens, and a photodetector having a light receiving part of a predetermined pattern. This optical head 53 is provided at a position opposite to the magnetic head 54 with the magneto-optical disc 1 provided between them. When recording data to the magneto-optical disc 1, the magnetic head 54 is driven by a head driving circuit 66 of a recording system, which will be described later, to apply a modulation magnetic field corresponding to the data to be recorded, and a laser beam is cast onto a target track of the magneto-optical disc 1 by the optical head 53, thereby performing thermomagnetic recording based on a magnetic field modulation system. The optical head 53 detects a reflected beam of the laser beam cast onto the target track, thus detecting a focusing error by a so-called astigmatic method, for example, and also detecting a tracking error by a so-called push-pull method, for example. When reproducing data from the magneto-optical disc 1, the optical head 53 detects the focusing error and the tracking error and detects, at the same time, the difference in the polarization angle (Kerr rotation angle) of the reflected beam of the laser beam from the target track, thus generating a reproduced signal.

The output of the optical head 53 is supplied to an RF circuit 55. The RF circuit 55 extracts the focusing error signal and the tracking error signal from the output of the optical head 53 and supplies these signals to a servo control circuit 56. The RF circuit 55 also binarizes the reproduced signal and supplies the binary signal to a decoder 71 of a reproducing system, which will be described later.

The servo control circuit 56 is constituted by, for example, a focusing servo control circuit, a tracking servo control circuit, a spindle motor servo control circuit, a thread servo control circuit and the like. The focusing servo control circuit performs focusing control of the optical system of the optical head 53 so that the focusing error signal becomes zero. The tracking servo control circuit performing tracking control of the optical system of the optical head 53 so that the tracking error signal becomes zero. The spindle motor servo control circuit controls the spindle motor 51 to rotationally drive the magneto-optical disc 1 at a predetermined rotation speed (for example, constant linear velocity). The thread servo control circuit moves the optical head 53 and the magnetic head 54 to the position of the target track on the magneto-optical disc 1 designated by a system controller 57. The servo control circuit 56, which carries out such various control operations, sends the system controller 57 information indicating the operating status of each part controlled by the servo control circuit 56.

The system controller 57 is connected with a key input operating unit 58 and a display unit 59. The system controller 57 controls the recording system and the reproducing system in accordance with operation input information from the key input operating unit 58. The system controller 57 also manages the recording position and the reproducing position on a recording track which is being traced by the optical head 53 and the magnetic head 54, on the basis of address information of each sector reproduced from the recording track of the magneto-optical disc 1 by using header time and subcode Q-data. Moreover, the system controller 57 controls the display unit 59 to display the reproducing time on the basis of the data compression rate of the compressed data recording/reproducing device and the reproducing position information on the recording track.

For the display of the reproducing time, address information (absolute time information) of each sector reproduced from the recording track of the magneto-optical disc 1 by using header time and so-called subcode Q-data is multiplied by the reciprocal of the data compression rate (for example, 4 in the case of ¼ compression), thus finding the actual time information. The time information thus found is displayed on the display unit 59. Also in recording, if absolute time information has been recorded in advance (pre-formatted) on a recording track of, for example, a magneto-optical disc or the like, the pre-formatted absolute time information can be read and multiplied by the reciprocal of the data compression rate, thus displaying the current position as the actual recording time.

In the recording system of the optical disc recording/reproducing device shown in FIG. 1, an analog audio input signal $A_{IN}$ from an input terminal 60 is supplied to an A/D converter 62 via a low-pass filter 61. The A/D converter 62 quantizes the analog audio input signal $A_{IN}$. A digital audio signal thus obtained by the A/D converter 62 is supplied to an ATC (adaptive transform coding) encoder 63. Moreover, a digital audio input signal $D_{IN}$ from an input terminal 67 is supplied to the ATC encoder 63 via a digital input interface 68. The ATC encoder 63 performs bit compression (data compression) processing in accordance with a predetermined data compression rate with respect to digital audio PCM data of a predetermined transfer rate resulting from the quantization of the input signal $A_{IN}$ by the A/D converter 62. The compressed data (ATC data) outputted from the ATC encoder 63 is supplied to a memory (RAM) 64. For example, if the data compression rate is ⅛, the data transfer rate is lowered to ⅛ (9.375 sectors/second) of the data transfer rate (75 sectors/second) of a so-called CD-DA format, which is a standard digital audio CD format.

Writing and reading of data to and from the memory (RAM) 64 are controlled by the system controller 57. The memory 64 is used as a buffer memory for temporarily storing the ATC data supplied from the ATC encoder 63 and recording the ATC data onto a disc, when necessary. That is, for example, if the data compression rate is ⅛, the data transfer rate of the compressed audio data supplied from the ATC encoder 63 is lowered to ⅛ of the data transfer rate (75 sectors/second) of the standard CD-DA format, that is, 9.375 sectors/second. This compressed data is continuously written to the memory 64. For the compressed data (ATC data), recording of every eighth sector is enough as described above. However, since such recording of every eighth sector is practically almost impossible, the following sector-continuous recording is carried out.

This recording is carried out in a burst-like manner with a quiescent time at the same data transfer rate (75 sectors/second) as the standard CD-DA format, using a cluster made up of a predetermined plurality of sectors (for example, 32 sectors plus several sectors) as a recording unit. Specifically, from the memory 64, the ATC data having the data compression rate of ⅛, which is continuously written at the low transfer rate of 9.375 (=75/8) sectors/second corresponding to the bit compression rate, is read out as recording data in a burst-like manner at the transfer rate of 75 sectors/second. For this data, which is read out and then recorded, the data transfer rate as a whole including the recording quiescent time is the above-described low data transfer rate of 9.375 sectors/second, but the instantaneous data transfer rate within the time of the burst-like recording is the standard data transfer rate of 75 sectors/second. Therefore, when the disc rotation speed is the same as the standard CD-DA format (constant linear velocity), recording with the same recording density and recording pattern as the CD-DA format is carried out.

The ATC audio data, that is, the recording data read out from the memory 64 in a burst-like manner at the (instantaneous) transfer rate of 75 sectors/second is supplied to an encoder 65. In the data string supplied from the memory 64 to the encoder 65, a unit of recording continuously recorded in one recording consists of a cluster made up of a plurality of sectors (for example, 32 sectors) and several sectors for cluster connection arranged before and after the cluster. The sectors for cluster connection are set to be longer than the interleave length in the encoder 65 so that interleave will not affect data of the other clusters.

The encoder 65 performs encoding processing (parity addition and interleave processing) or EFM coding processing for error correction with respect to the recording data supplied from the memory 64 in a burst-like manner as described above. The recording data on which the coding processing was performed by the encoder 65 is supplied to the magnetic head driving circuit 66. The magnetic head driving circuit 66 is connected with the magnetic head 54 and drives the magnetic head 54 to apply a modulation magnetic field corresponding to the recording data to the magneto-optical disc 1.

The system controller 57 performs memory control of the memory 64 as described above and also controls the recording position so as to continuously record the recording data read out from the memory 64 in a burst-like manner in accordance with this memory control, to the recording track of the magneto-optical disc 1. The recording position is controlled as the system controller 57 manages the recording position of the recording data read out from the memory 64 in a burst-like manner and sends a control signal designating a recording position on the recording track of the magneto-optical disc 1 to the servo control circuit 56.

The reproducing system of the optical disc recording/reproducing device shown in FIG. 1 will now be described. This reproducing system is adapted for reproducing recording data continuously recorded on the recording track of the magneto-optical disc 1 by the above-described recording system. The reproducing system has a decoder 71 to which a reproduced output obtained by tracing the recording track of the magneto-optical disc 1 with a laser beam by the optical head 53 and binarized by the RF circuit 55 is supplied. In this case, data can be read not only from a magneto-optical disc but also from a reproduction-only disc which is the same as a so-called CD (compact disc) and an optical disc of a so-called CD-R type.

The decoder 71 corresponds to the encoder 65 in the above-described recording system. The decoder 71 performs processing such as decoding processing or EFM decoding processing for error correction as described above with respect to the reproduced output binarized by the RF circuit 55, and reproduces the ATC audio data having the above-described compression rate of ⅛ at a transfer rate of 75 sectors/second, which is higher than the normal transfer rate. The reproduced data obtained by this decoder 71 is supplied to a memory (RAM) 72.

Writing and reading of data to and from the memory (RAM) 72 are controlled by the system controller 57. The reproduced data supplied from the decoder 71 at the transfer rate of 75 sectors/second is written to the memory 72 in a burst-like manner at the same transfer rate of 75 sectors/second. From the memory 72, the reproduced data written in a burst-like manner at the transfer rate of 75 sectors/second is continuously read out at a transfer rate of 9.375 sectors/second, which corresponds to the data compression rate of ⅛.

The system controller 57 performs memory control to write the reproduced data to the memory 72 at the transfer rate of 75 sectors/second and to continuously read out the reproduced data from the memory 72 at the transfer rate of 9.375 sectors/second. The system controller 57 performs memory control of the memory 72 as described above and also controls the reproducing position so as to continuously reproduce the reproduced data written from the memory 72 in a burst-like manner in accordance with this memory control, from the recording track of the magneto-optical disc 1. The recording position is controlled as the system controller 57 manages the reproducing position of the reproduced data read out from the memory 72 in a burst-like manner and sends a control signal designating a reproducing position on the recording track of the magneto-optical disc 1 or the optical disc 1 to the servo control circuit 56.

The ATC audio data obtained as the reproduced data continuously read out from the memory 72 at the transfer rate of 9.375 sectors/second is supplied to an ATC decoder 73. The ATC decoder 73 corresponds to the ATC encoder 63 of the recording system. The ATC decoder 73 reproduces 16-bit digital audio data, for example, by performing data expansion (bit expansion) of the ATC data to eight times. The digital audio data from the ATC decoder 73 is supplied to a D/A converter 74.

The D/A converter 74 converts the digital audio data supplied from the ATC decoder 73 to an analog signal and thus forms an analog audio output signal $A_{OUT}$. The analog audio signal $A_{OUT}$ obtained by the D/A converter 74 is outputted from an output terminal 76 via a low-pass filter 75.

The high-efficiency coding of a signal will now be described in detail. Specifically, the technique of high-efficiency coding an input digital signal such as an audio PCM signal by using subband coding (SBC), adaptive transform coding (ATC) and adaptive bit allocation will be described with reference to FIG. 2 and the subsequent drawings.

Figure 2:
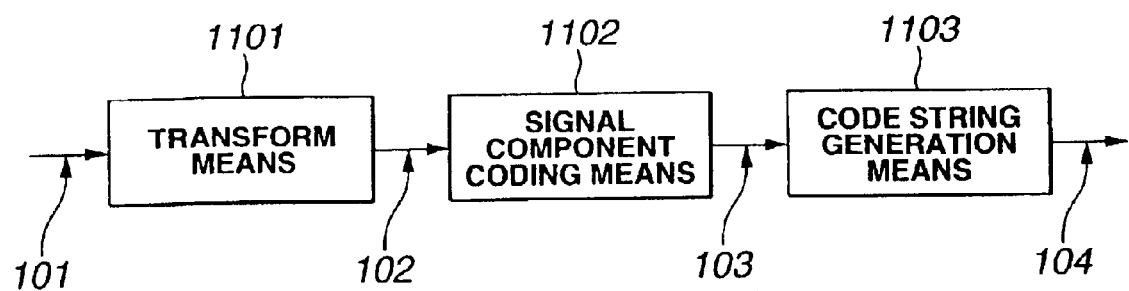
FIG. 2 is a block diagram showing a schematic structure of an exemplary coding device used for the description of the embodiment of the present invention.

FIG. 2 is a block diagram showing a specific example of an acoustic waveform signal coding device used for the description of the embodiment of the present invention. In this example, an inputted signal waveform signal 101 is transformed to signals 102 of respective signal frequency components by transform means 1101. After that, each component is coded by signal component coding means 1102 and a code string 104 is generated by code string generation means 1103.

Figure 3:
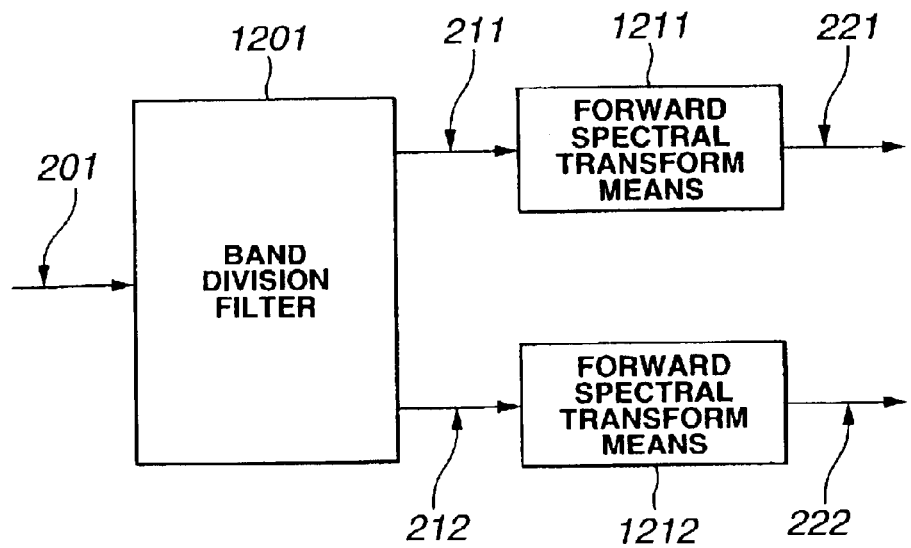
FIG. 3 is a block diagram showing a specific example of transform means of the coding device of FIG. 2.

FIG. 3 shows a specific example of the transform means 1101 of FIG. 2. A signal divided into two bands by a band division filter is transformed to spectral signal components 221, 222 of the respective bands by forward spectral transform means 1211, 1212 using MDCT or the like. A signal 201 of FIG. 3 corresponds to the signal 101 of FIG. 2 and the signals 221, 222 of FIG. 3 correspond to the signals 102 of FIG. 2. At the transform means shown in FIG. 3, the bandwidth of the signal of the signals 221, 222 is half the bandwidth of the signal 201 and each of the signals 221, 222 is decimated to a half of the signal 201. As the transform means, various other transform means than this specific example may be considered. For example, the input signal may be directly transformed to a spectral signal by MDCT. Alternatively, the input signal may be transformed by DFT (discrete Fourier transform) or DCT (discrete cosine transform) instead of MDCT. While the signal can be divided into band components by a so-called band division filter, it is convenient to employ a method of transforming the signal to frequency components by the above-described spectral transform in which many frequency components can be obtained by a relatively small quantity of arithmetic operation.

Figure 4:
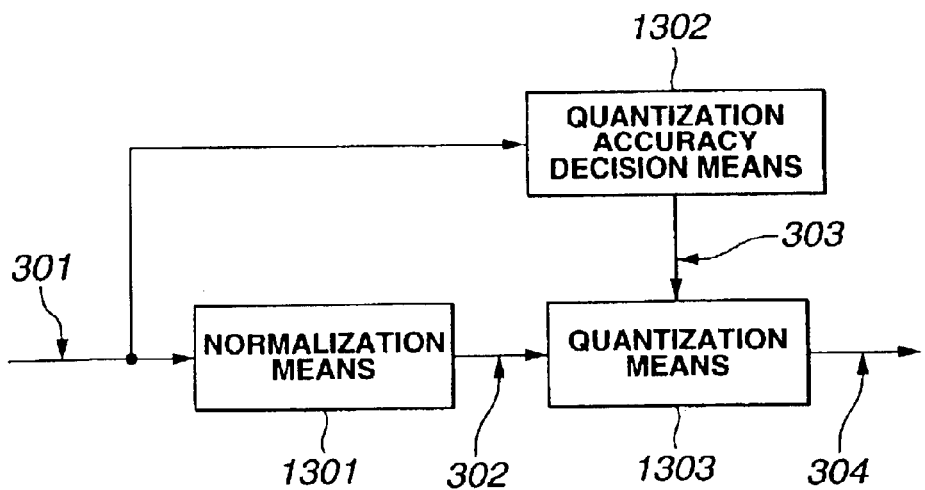
FIG. 4 is a block diagram showing a specific example of signal component coding means of the coding device of FIG. 2.

FIG. 4 shows a specific example of the signal component coding means 1102 of FIG. 2. An input signal 301 is normalized for each predetermined band (to generate a signal 302) by normalization means 1301. After that, the signal is quantized by quantization means 1303 on the basis of quantization accuracy information 303 calculated by quantization accuracy decision means 1302, and a signal 304 is taken out. The signal 301 of FIG. 4 corresponds to the signal 102 of FIG. 2 and the signal 304 corresponds to the signal 103 of FIG. 2. However, the signal 304 contains normalization factor information and quantization accuracy information as well as the quantized signal components.

Figure 5:
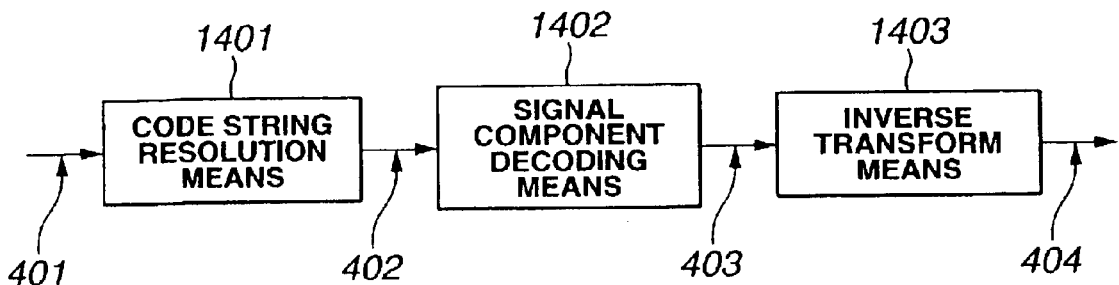
FIG. 5 is a block diagram showing a schematic structure of an exemplary decoding device used for the description of the embodiment of the present invention.

FIG. 5 is a block diagram showing a specific example of a decoding device for outputting an acoustic signal from a code string generated by the coding device shown in FIG. 2.

In this specific example, codes 402 of respective signal components are extracted from a code string 401 by code string resolution means 1401. After respective signal components 403 are restored from the codes 402 by signal component decoding means 1402, an acoustic waveform signal 404 is outputted by inverse transform means 1403.

Figure 6:
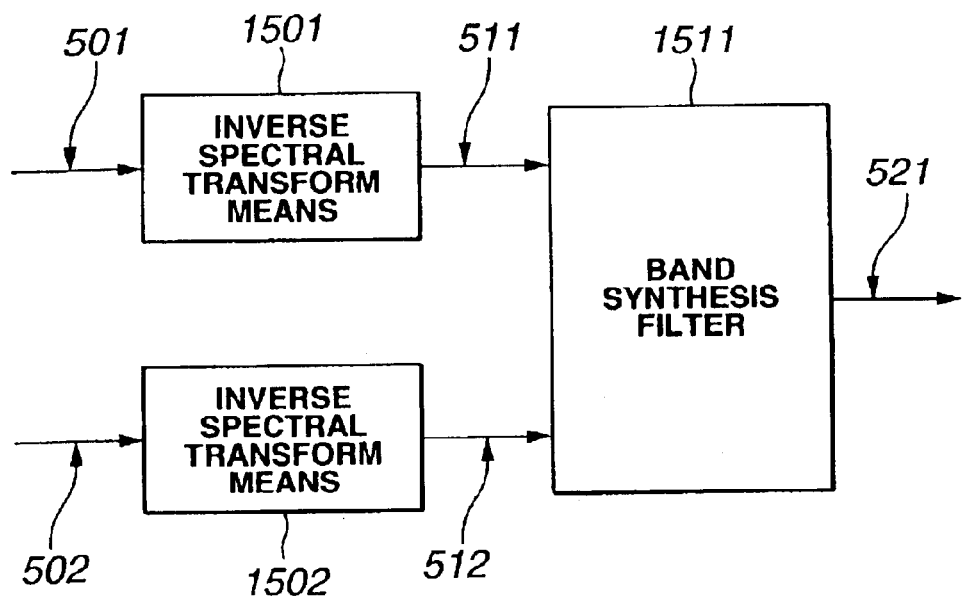
FIG. 6 is a block diagram showing a specific example of inverse transform means of the decoding device of FIG. 5.

FIG. 6 shows a specific example of the inverse transform means 1403 of FIG. 5, which corresponds to the specific example of the transform means of FIG. 3. Signals 511, 512 of respective bands obtained by inverse spectral transform means 1501, 1502 are synthesized by a band synthesis filter 1511. The signals 501, 502 of FIG. 6 correspond to the signals 403 of FIG. 5 and a signal 521 of FIG. 6 corresponds to the signal 404 of FIG. 5.

Figure 7:
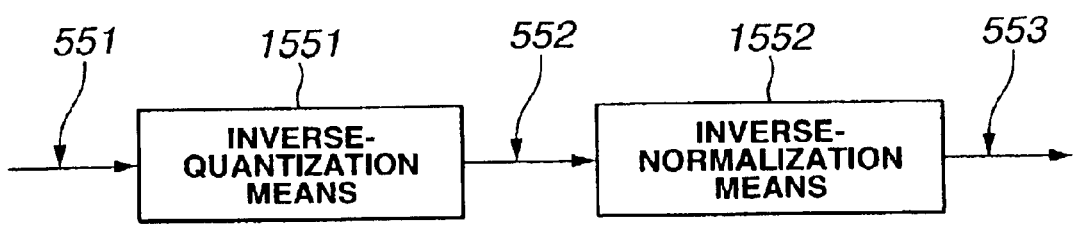
FIG. 7 is a block diagram showing a specific example of signal component decoding means of the decoding device of FIG. 5.

FIG. 7 shows a specific example of the signal component decoding means 1402 of FIG. 5. A signal 551 of FIG. 7 corresponds to the signal 402 of FIG. 5 and a signal 553 of FIG. 7 corresponds to the signal 403 of FIG. 5. The spectral signal 551 is de-quantized (to a signal 525) by inversal-quantization means 1551 and then de-normalized by inversal-normalization means 1552, and the signal 553 is taken out.

Figure 8:
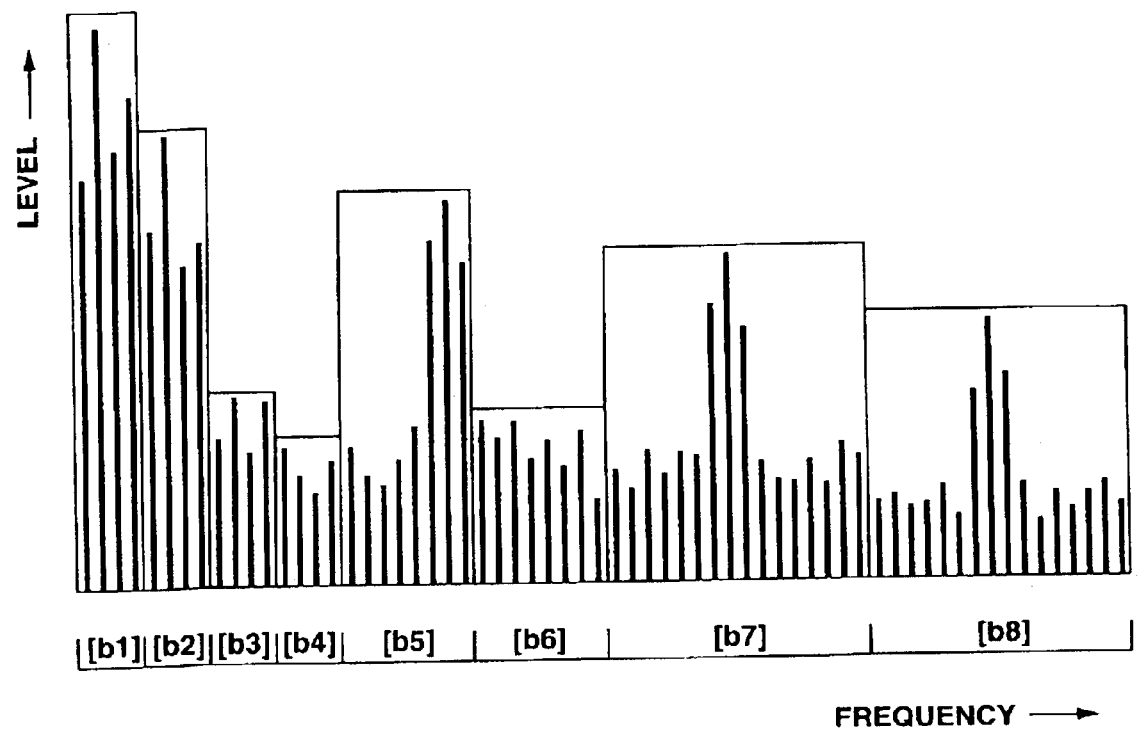
FIG. 8 is a view for explaining a coding method used for the description of the embodiment of the present invention.

FIG. 8 is a view for explaining a conventional coding method in the coding device shown in FIG. 2. In this example shown in FIG. 8, a spectral signal is obtained by the transform means of FIG. 3. FIG. 8 shows the absolute value of the spectrum of MDCT with its level converted to dB. An input signal is transformed to, for example, 64 spectral signals for each predetermined time block, and normalization and quantization of these spectral signals are carried out for eight bands b1 to b8 each (hereinafter referred to as coding unit). By varying the quantization accuracy for each coding unit depending on the distribution of frequency components, highly auditorily efficient coding is possible in which deterioration in the sound quality is restrained to the minimum.

Figure 9:
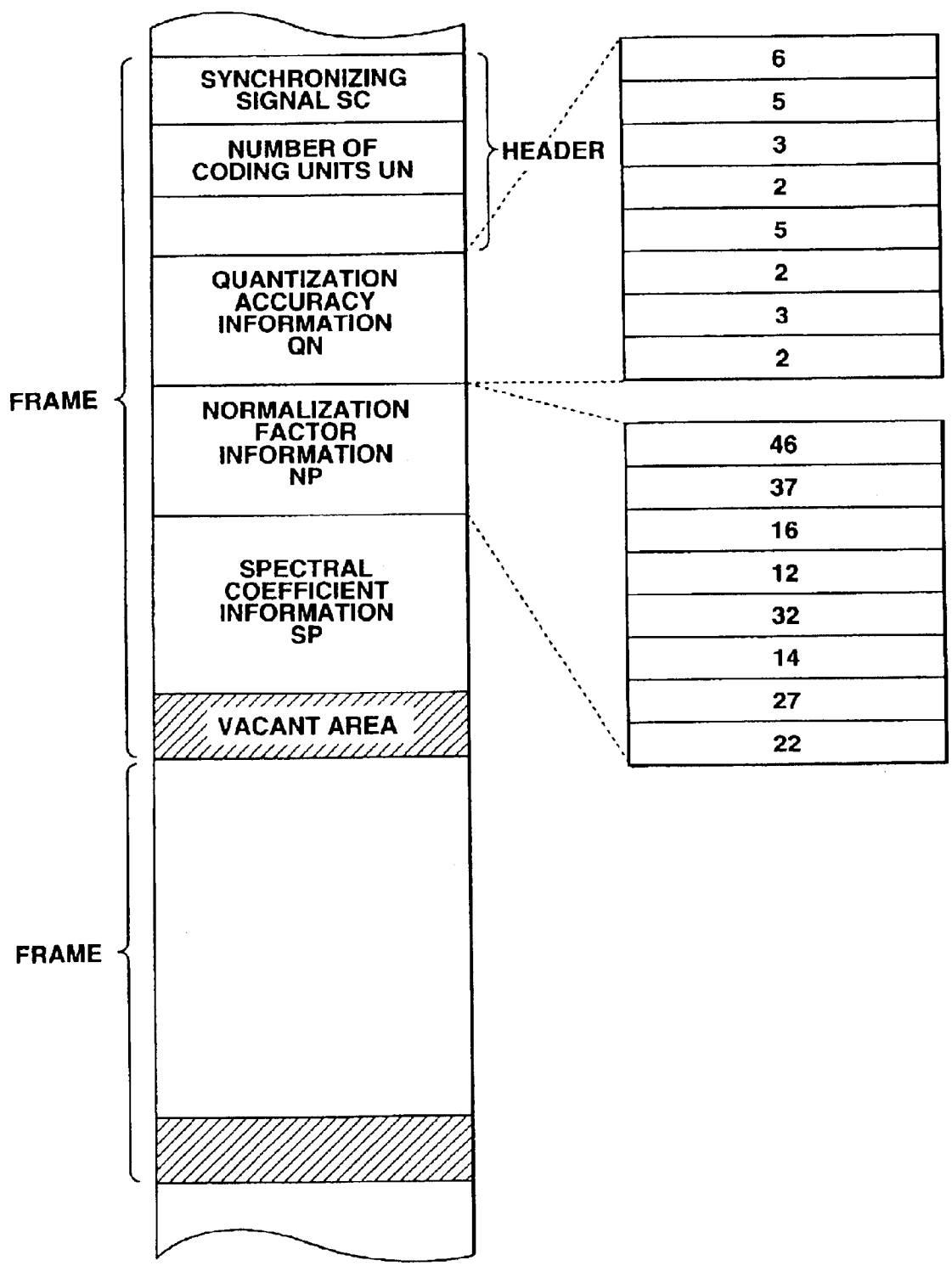
FIG. 9 is a view for explaining a exemplary code string obtained by the coding method used for the description of the embodiment of the present invention.

FIG. 9 shows a specific example in the case where a signal coded as described above is recorded to a recording medium. In this specific example, a fixed-length header containing a synchronizing signal SC is attached to the leading end of each frame, and the number of coding units UN is recorded in this header. The header is followed by quantization accuracy information QN, which is recorded by the number of coding units. After that, normalization factor information NP is recorded by the number of coding units. Normalized and quantized spectral coefficient information SP is subsequently recorded. In the case of a fixed-length frame, a vacant area may be provided after the spectral coefficient information SP. In the example of FIG. 9, the spectral signal of FIG. 8 is coded. As the quantization accuracy information QN, for example, 6 bits of a coding unit of the lowest frequency band to 2 bits of a coding unit of the highest frequency band are allocated as shown in FIG. 9. As the normalization factor information NP, for example, values of 46 of the coding unit of the lowest frequency band to 22 of the coding unit of the highest frequency band are allocated as shown in FIG. 9. As this normalization factor information NP, values proportional to, for example, dB values, are used.

It is possible to further improve the coding efficiency in the above-described method. For example, by allocating a relatively short code length to a spectral signal with a high frequency, of the quantized spectral signals, and a relatively long code length to a spectral signal with a low frequency, the coding efficiency can be improved. Moreover, the quantity of sub information such as quantization accuracy information and normalization factor information can be relatively reduced and the frequency resolution can be improved by providing a long transform block length. Therefore, as the quantization accuracy can be more minutely controlled on the frequency axis, the coding efficiency can be improved.

Furthermore, the specification and drawings of the Japanese Patent Application No.H5-152865 or WO94/288633 by the present inventors proposes a method of separating an auditorily important tonal component, that is, a signal component having energy concentrated around a specific frequency, from a spectral signal, and separately coding the signal component from the other spectral components. This enables efficient coding at a high compression rate with little deterioration in the auditory sound quality of audio signals.

Figure 10:
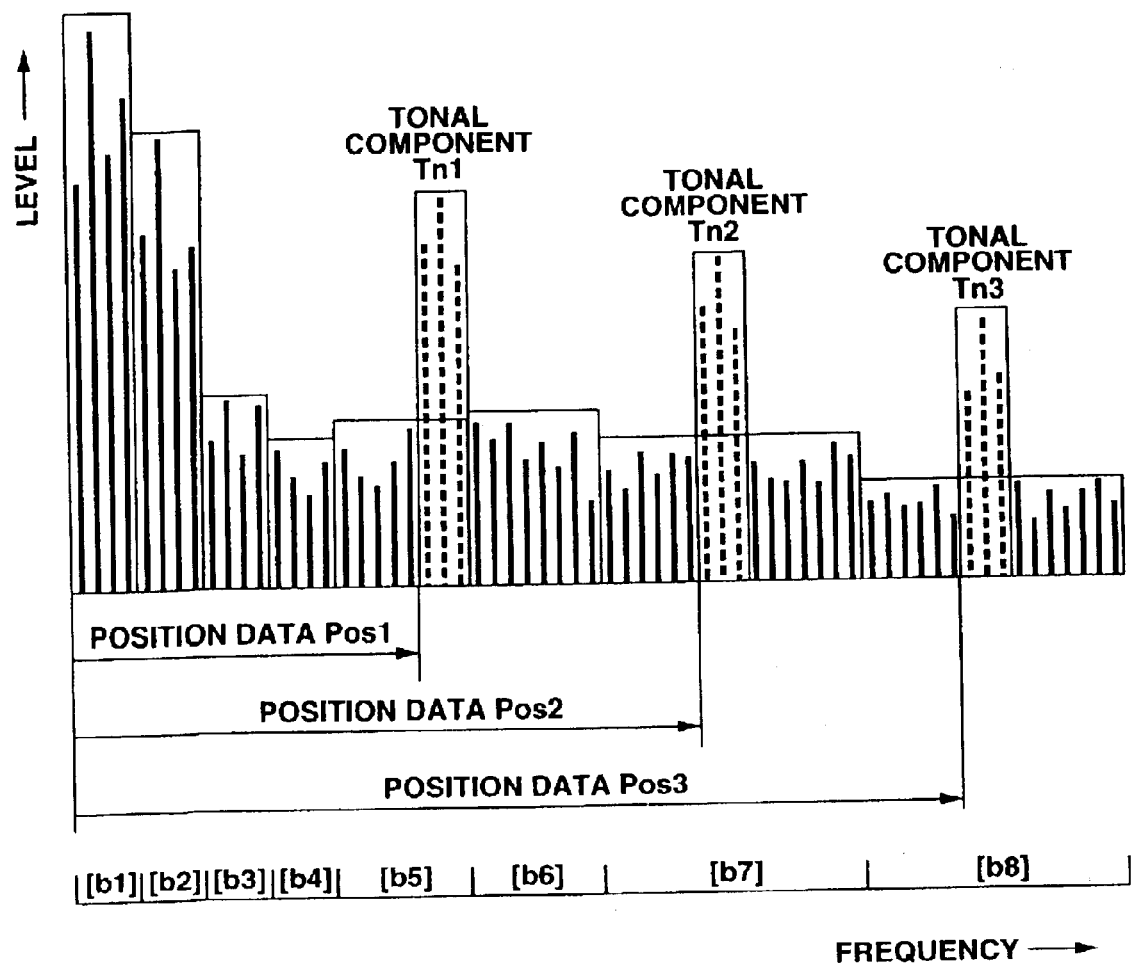
FIG. 10 is a view for explaining another exemplary coding method used for the description of the embodiment of the present invention.

FIG. 10 is a view for explaining the case where coding is carried out by using such a method. FIG. 10 shows the separation and coding of tonal components having particularly high levels, for example, as tonal components Tn1 to Tn3, from a spectral signal. While position information, for example, position data Pos1 to Pos3 are required for the tonal components Tn1 to Tn3, the spectral signal from which the tonal components Tn1 to Tn3 were extracted can be quantized with a small number of bits. Therefore, by applying this method to a signal having energy concentrated at a specific frequency, particularly efficient coding is made possible.

Figure 11:
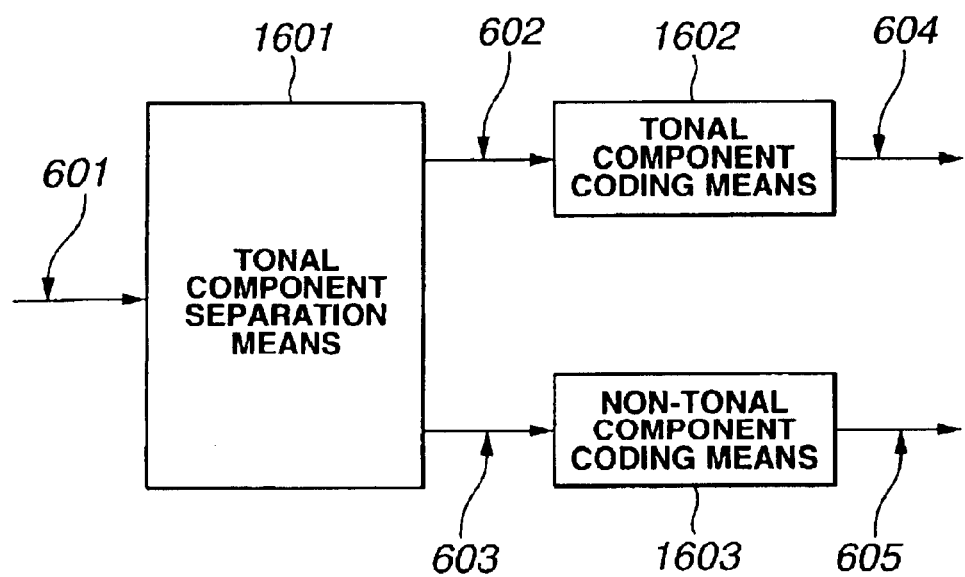
FIG. 11 is a block diagram showing an example of signal component coding means for realizing the coding method explained with reference to FIG. 10.

FIG. 11 shows the structure of the signal component coding means 1102 of FIG. 2 in the case where a tonal component is thus separated and coded. The output signal 102 (signal 601 of FIG. 11) from the transform means 1101 of FIG. 2 is separated into a tonal component (signal 602) and a non-tonal component (signal 603) by tonal component separation means 1601, then coded by tonal component coding means 1602 and non-tonal component coding means 1603, respectively, and taken out as signals 604 and 605, respectively. The tonal component coding means 1602 and the non-tonal component coding means 1603 have a structure similar the structure shown in FIG. 4, but the tonal component coding means 1602 also performs coding of the position information of the tonal component.

Figure 12:
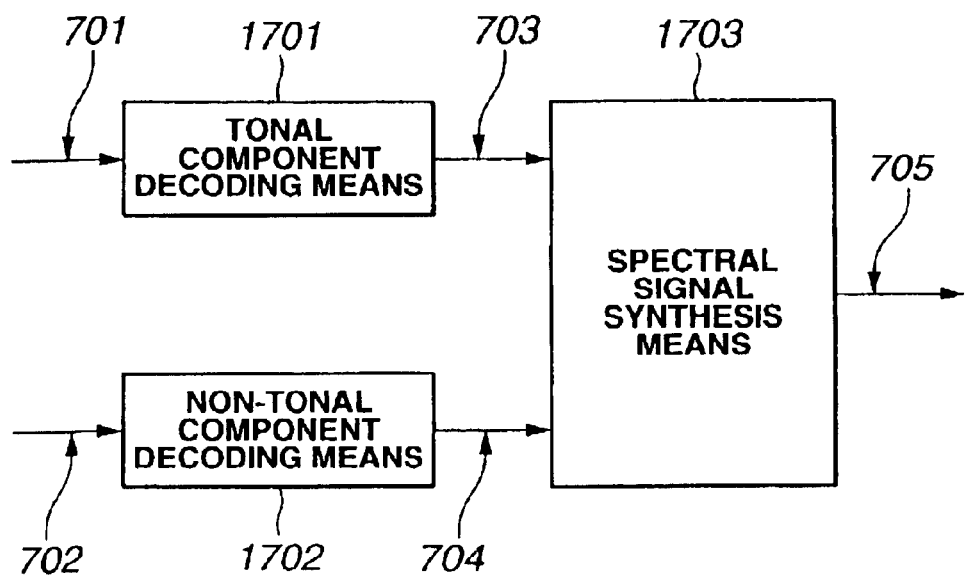
FIG. 12 is a block diagram showing an example of signal component decoding means used in a decoding device for decoding a code string obtained by the coding method explained with reference to FIG. 10.

Similarly, FIG. 12 shows the structure of the signal component decoding means 1402 of FIG. 5 in the case where a tonal component is separated and coded as described above. A signal 701 of FIG. 12 corresponds to the signal 604 of FIG. 11 and a signal 702 of FIG. 12 corresponds to the signal 605 of FIG. 11. The signal 701 is decoded by tonal component decoding means 1701 and sent as a signal 703 to spectral signal synthesis means 1703. The signal 702 is decoded by non-tonal component decoding means 1702 and sent to the spectral signal synthesis means 1703. The spectral signal synthesis means 1703 synthesizes the tonal component (signal 703) and the non-tonal component (signal 704) and outputs a signal 705.

Figure 13:
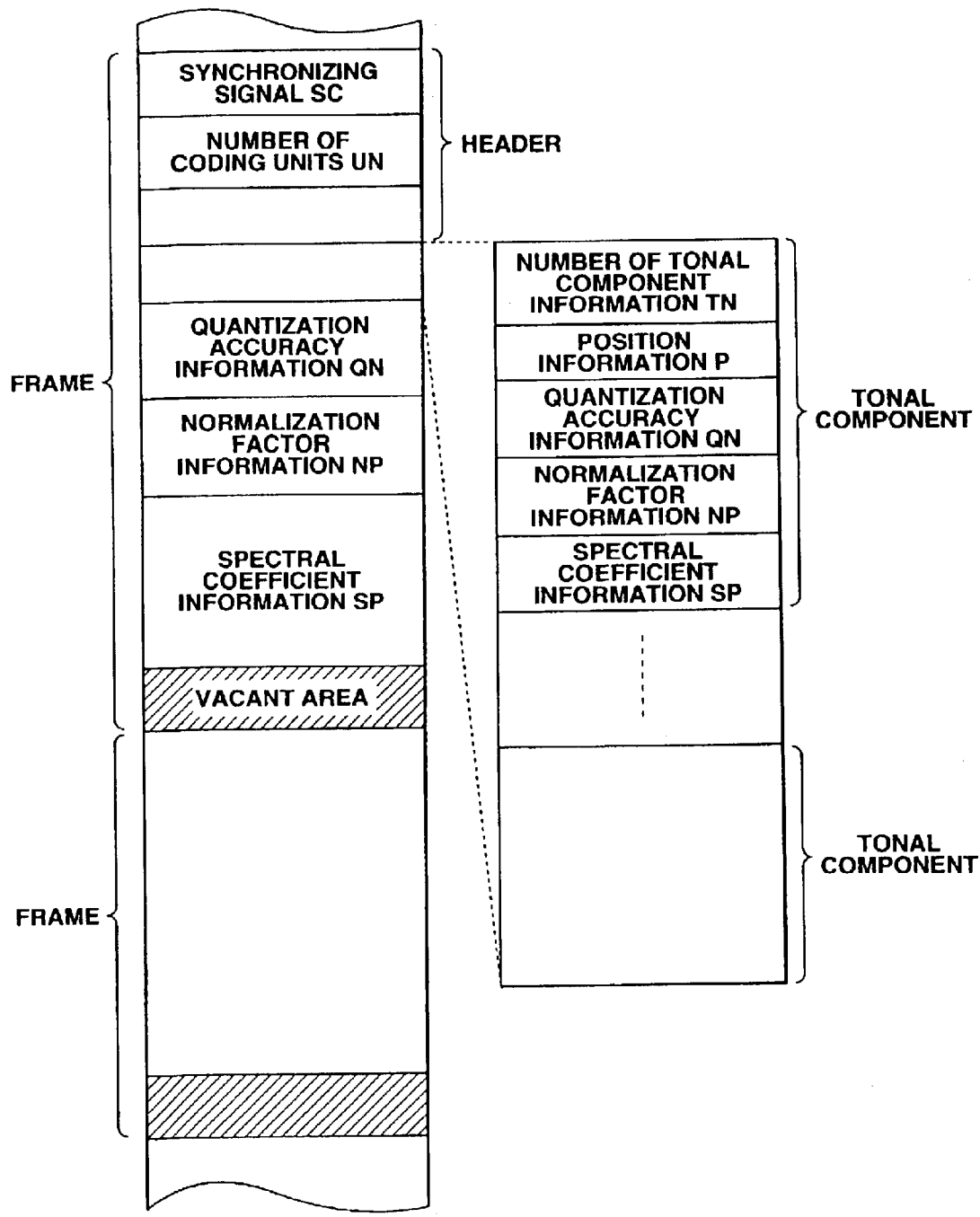
FIG. 13 is a view showing an exemplary code string obtained by the coding method explained with reference to FIG. 10.

FIG. 13 shows a specific example in the case where a signal coded as described above is recorded to a recording medium. In this specific example, a tonal component is separated and coded, and its code string is recorded in a part between a header part and quantization accuracy information QN. In the tonal component string, the number of tonal components information TN is first recorded and data of each tonal components are recorded then. The data of the tonal components include position information P, quantization accuracy information QN, normalization factor information NP and spectral coefficient information SP. Moreover, in this specific example, a transform block length for transform to a spectral signal is made twice that of the specific example of FIG. 9, thus improving the frequency resolution. Furthermore, by introducing a variable-length code, a code string of an acoustic signal corresponding to a length twice that of the specific example of FIG. 9 is recorded in a frame having the same number of bytes.

In the above description, the technique preceding the description of the embodiment of the present invention is explained. In the embodiment of the present invention, for example, in the case of applying this technique to audio, the content of an audio signal of relatively low quality is made free to listen to for trial listening, and an audio signal of high quality is made available for listening by purchasing or otherwise acquiring additional data of a relatively small quantity.

Figure 14:
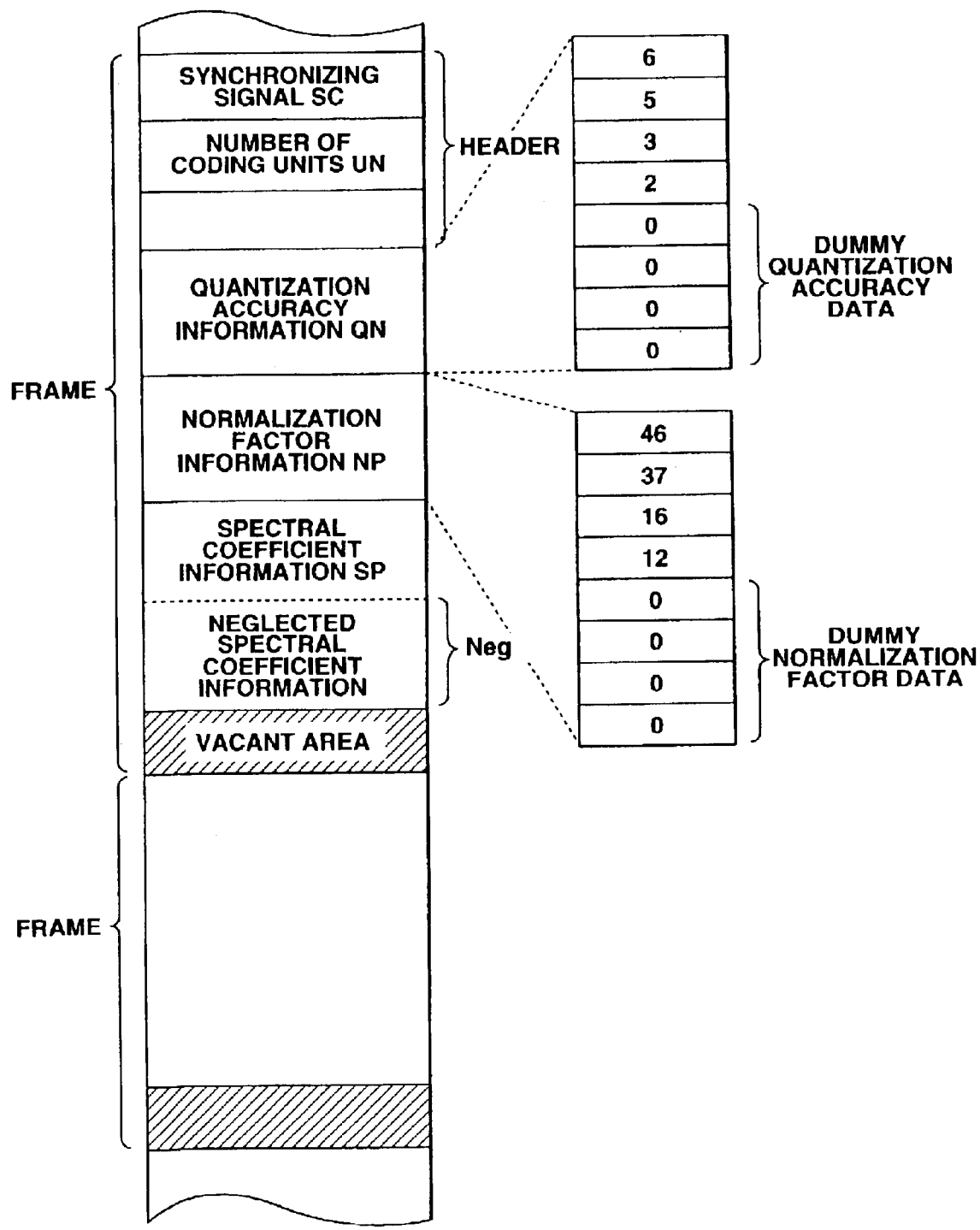
FIG. 14 is a view showing an exemplary code string obtained by the coding method used in the embodiment of the present invention.
Figure 15:
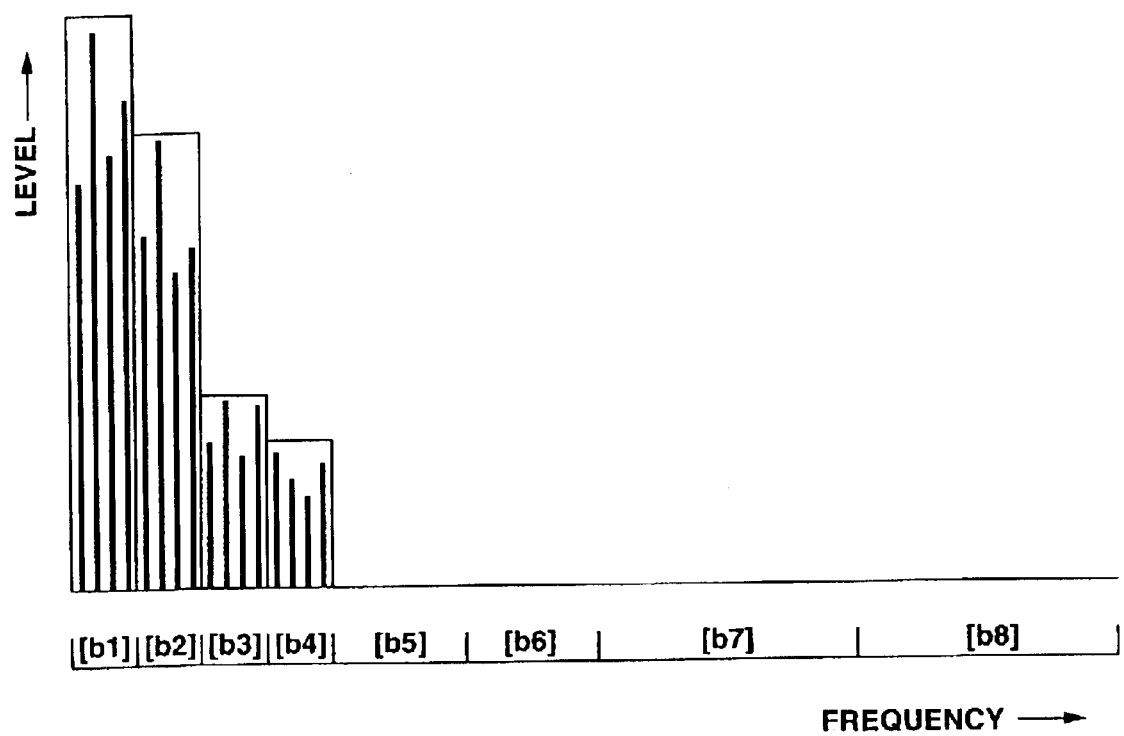
FIG. 15 is a view showing an exemplary spectral signal of a reproduced signal when a code string obtained by the coding method explained with reference to FIG. 14 is reproduced.

Specifically, in the embodiment of the present invention, for example, in a part to be coded as shown in FIG. 9, data indicating 0-bit allocation is coded in four coding units on the high-frequency side as dummy quantization accuracy data within quantization accuracy information QN, and normalization factor information 0 of the minimum value is coded in four coding units on the high-frequency side as dummy normalization factor data within normalization factor information NP, as shown in FIG. 14. (In this specific example, the normalization factor has a value proportional to the dB value.) By thus setting 0 as the quantization accuracy information on the high-frequency side, spectral coefficient information in a Neg area shown in FIG. 14 is actually neglected. As this is reproduced by an ordinary reproducing device, narrow-band data having a spectrum as shown in FIG. 15 will be reproduced. Moreover, by coding the dummy data for the normalization factor information, it becomes more difficult to conjecture the quantization accuracy information and carry out unauthorized reproduction of high-quality data.

In a signal reproducing device and method used for the embodiment of the present invention, when reproducing a code string of a predetermined format obtained by coding a signal, dummy data of a first code string in which a part of the code string of the predetermined format is the dummy data is rewritten by using a second code string for complementing the dummy data part, and the first code string and the code string obtained by the rewriting are switched and outputted in accordance with a predetermined condition.

In a signal recording device and method used for the embodiment of the present invention, when recording a code string of a predetermined format obtained by coding a signal, dummy data of a first code string in which at least a part of the code string of the predetermined format is the dummy data is rewritten by using a second code string for complementing the dummy data part.

The quantization accuracy information and the normalization factor information of all the bands may be replaced by dummy data. In this case, no significant data can be reproduced by an ordinary reproducing device. In order to carry out trial viewing/listening, a part of the dummy data is rewritten and reproduced by using a partial code string of the second code string (for example, data on the low-frequency side of the quantization accuracy information and the normalization factor information). If reproduction of a high-quality signal is desired, the quantization accuracy information and the normalization factor information corresponding to the remaining dummy data, that is, a code string of the part other than the foregoing partial code string in the second code string, may be purchased or otherwise acquired as additional data to complement all the dummy data. This enables reproduction of a high-quality signal (high sound quality or high image quality). By changing the quantity of the partial code string of the second code string, the quality of a signal for trial viewing/listening can be arbitrarily changed.

Figure 16:
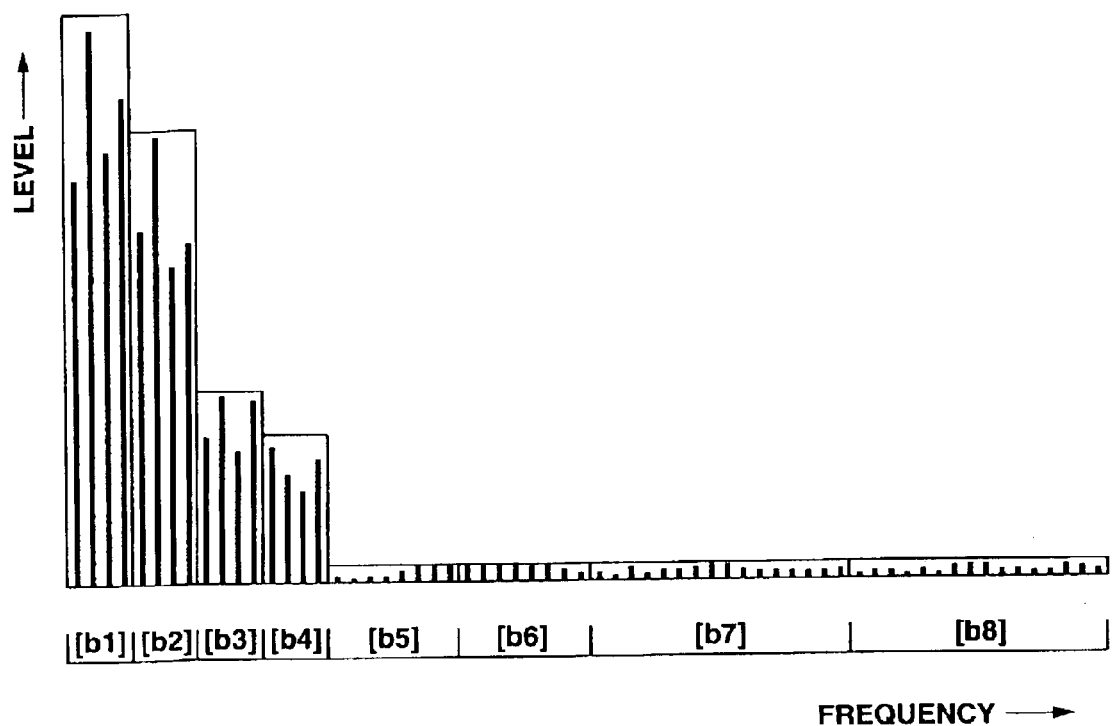
FIG. 16 is a view showing an exemplary spectral signal of a reproduced signal when a code string obtained by another example of the coding method explained with reference to FIG. 14 is reproduced.

In the above-described example, both the quantization accuracy information and the normalization factor information are replaced by dummy data. However, it is also conceivable to replace only one of them with dummy data. If only the quantization accuracy information is replaced by dummy data of 0-bit data, narrow-band data having a spectrum as shown in FIG. 15 is reproduced. On the other hand, if only the normalization factor information is replaced by dummy data having a value of 0, a spectrum as shown in FIG. 16 is provided. Although the spectrum on the high-frequency side is not strictly 0, it is practically 0 in view of the audibility. In the embodiment of the present invention, the signal of this case, too, is referred to as narrow-band signal.

Depending on which of the quantization accuracy information and the normalization factor information is to be replaced by dummy data, the possibility that their true values might be conjectured to perform high-quality reproduction is different. The case where both the quantization accuracy information and the normalization factor information are replaced by dummy data is the most secure case because there is no data for conjecturing their true values. In the case where only the quantization accuracy information is replaced by dummy data, for example, if the original bit allocation algorithm is adapted for finding the quantization accuracy information on the basis of the normalization factor, there is a relatively high possibility that the quantization accuracy information might be conjectured on the basis of the normalization factor information. On the other hand, since it is relatively difficult to find the normalization factor information from the quantization accuracy information, the method of replacing only the normalization factor information with dummy data has a lower possibility than the method of replacing only the quantization accuracy information with dummy data. Depending on the band, the quantization accuracy information or the normalization factor information may be selectively replaced by dummy data.

Moreover, a part of the spectral coefficient information may be replaced by dummy data. Particularly since a spectrum in the intermediate-frequency band is significant in terms of the sound quality, data of this part may be replaced by dummy data of 0 and data of the intermediate/high-frequency band may be replaced by dummy quantization accuracy information or dummy normalization factor information. The dummy data need not necessarily be 0. For example, in variable-length coding, an arbitrary code which is shorter than a code expressing the true numerical value may be used for replacement. In that case, the band where the data is replaced by dummy quantization accuracy information or dummy normalization factor information covers the band where a part of the spectral coefficient information is replaced by dummy data, thus performing correct narrow-band reproduction. Particularly, in the case where a variable-length code is used for coding the spectral coefficient information, if a part of the information of the intermediate-frequency band is missing, data of higher-frequency bands cannot be decrypted.

In any case, conjecture of relatively large data including the content of a signal is more difficult than decryption of a relatively short key length used for ordinary encryption, and for example, the possibility of infringement on the copyright of a right holder of a tune is lowered. Moreover, even if dummy data is conjectured with respect to a certain tune, there is no possibility of expansion of damage to other tunes, unlike the case where a decryption method for the encryption algorithm is made known. Also in this respect, higher security is provided than in the case where particular encryption is performed.

Figure 17:
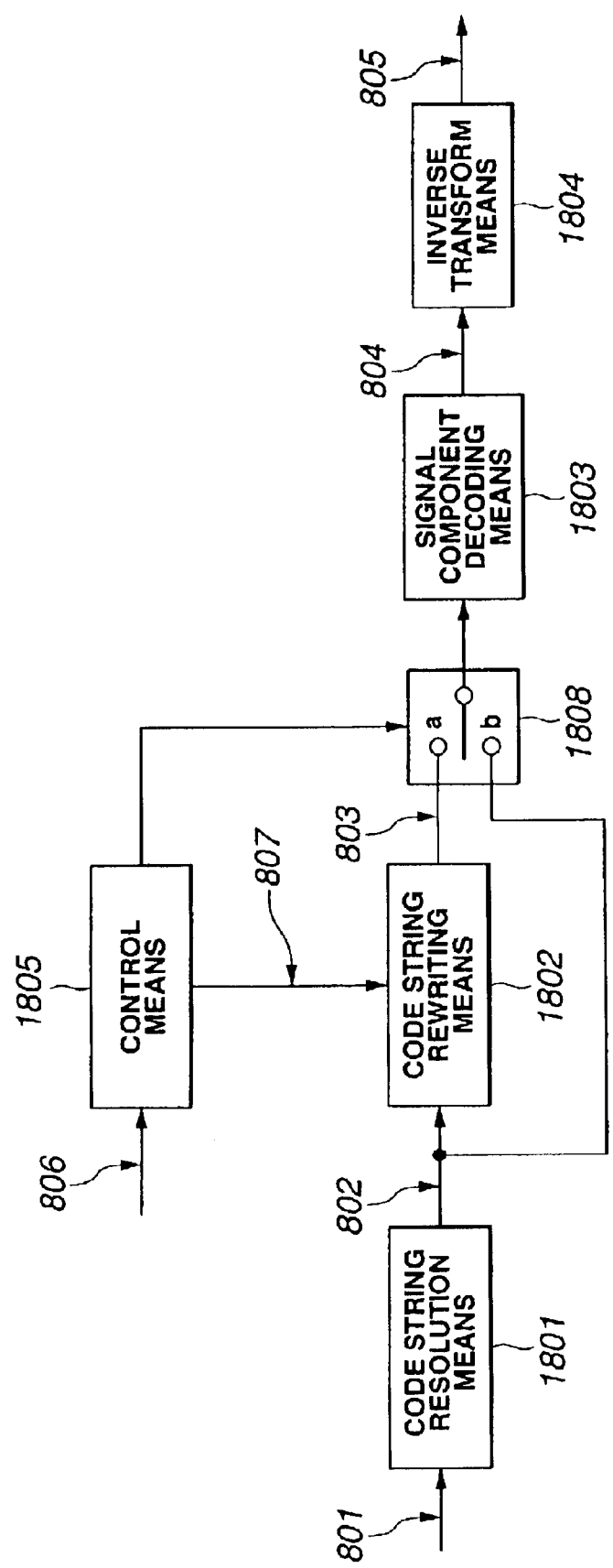
FIG. 17 is a view showing a schematic structure of a reproducing device for realizing the coding method explained with reference to FIG. 15.

FIG. 17 is a block diagram showing an exemplary reproducing device used for the embodiment of the present invention, which is an improvement of the conventional decoding means shown in FIG. 5.

In FIG. 17, an input signal 801 is a code string (first code string) a part of which is replaced by dummy data. In this case, the quantization accuracy information and the normalization factor information of all the bands or on the high-frequency side are replaced by dummy data. The signal 801, which is a high-efficiency coding signal having the dummy data embedded therein, is received, for example, via a predetermined public network (ISDN (Integrated Services Digital Network), satellite network, analog network or the like) and inputted to code string resolution means 1801. First, the content of the code string of the signal is resolved by the code string resolution means 1801 and sent as a signal 802 to code string rewriting means 1802 and a selected terminal b of a switch 1808. The code string rewriting means 1802 receives true quantization accuracy information and normalization factor information 806 of a second code string for complementing the dummy data part as a signal 807 through control means 1805. The code string rewriting means 1802 rewrites the dummy part of the quantization accuracy information and the normalization factor information by using the signal 807 and sends the result of rewriting to a selected terminal a of the switch 1808. The output from the switch 1808 is sent to signal component decoding means 1803. The signal component decoding means 1803 decodes the data to spectral data 804 and inverse transform means 1804 transforms the spectral data 804 to time series data 805, thus reproducing the audio signal.

In the structure shown in FIG. 17, in the case of the trial viewing/listening mode, the signal 802 from the code string resolution means 1801 bypasses the code string rewriting means 1802 and is inputted to the signal component decoding means 1803 via the selected terminal b of the switch 1808. In the case of the purchase mode, the true quantization accuracy information and/or true normalization factor information 806 for replacing the above-described dummy data is inputted to the control means 1805 via the same public network as the signal 801. The control means 1805 rewrites the dummy data in the high-efficiency coding signal 801 having the dummy data embedded therein which is inputted to the code string rewriting means 1802, by using the true quantization accuracy information and/or true normalization factor information 806. A high-efficiency coding signal 803 obtained as a result of this rewriting is inputted to the signal component decoding means 1803 via the selected terminal a of the switch 1808.

Thus, the user can listen to trial listening music of low sound quality to which the dummy data is added, in the trial viewing/listening mode, and can listen to music of high sound quality when a predetermined purchase procedure (accounting, authentication and the like) is done.

In the above-described specific example, all the dummy data is rewritten (complemented) using the second code string. However, the present invention is not limited to this example and it is also possible to rewrite at least a part of the dummy data by using a partial code string of the second code string and then reproduce the data. In the case of thus replacing at least a part of the dummy data by using the partial code string of the second code string and then reproducing the data, for example, the quality (sound quality or image quality) of the trial viewing/listening can be arbitrarily changed by arbitrarily changing the proportion of the partial code string of the second code string. In this case, even in the trial viewing/listening mode, the partial code string of the second code string is inputted as the signal 806 to the control means 1805 and then sent as the signal 807 to the code string rewriting means 1802. Therefore, a part of the dummy data embedded in the first code string from the code string resolution means 1801 may be rewritten by using the partial code string of the second code string and the switch 1808 may be switched to connect to the selected terminal a, thus sending the result of rewriting to the signal component decoding means 1803.

When the coding system is a system for spectrally transforming a content signal, dividing its band and generating a code string of a predetermined format containing quantization accuracy information, normalization factor information and spectral coefficient information for each band, the dummy data corresponds to at least a part of at least one of the quantization accuracy information, the normalization factor information and the spectral coefficient information. In this case, the partial code string of the second code string is information on the low-frequency side of the dummy data. Specifically, for example, when the dummy data is of information on the high-frequency side of the quantization accuracy information or information on the high-frequency side of the normalization factor information, the partial code string of the second code string is information on the low-frequency side of the quantization accuracy information or the normalization factor information corresponding to the dummy data.

When the dummy data rewriting data (partial code string of the second code string) is for all the bands or approximately all the bands of the information corresponding to the dummy data, an audio signal having a broad band and high quality is reproduced. When the dummy data rewriting data (partial code string of the second code string) is for a partial narrow band of the information corresponding to the dummy data, an audio signal having a narrow band is reproduced. Thus, depending on the bandwidth to which the dummy data rewriting data corresponds, the sound quality of trial listening can be controlled and reproduction of an audio signal having a broad band is made possible.

In the above-described embodiment, the high-efficiency coding signal 801 having the dummy data embedded therein and the true quantization accuracy information and/or true normalization factor information (second code string or its partial code string) 806 for replacing the dummy data are acquired from the server side via the same public network. However, for example, the high-efficiency coding signal 801 having a large quantity of dummy data embedded therein may be acquired through a satellite network with a high transmission rate while the true quantization accuracy information and/or true normalization factor information 806 having a small quantity of data may be separately acquired by using a telephone line or a network with a relatively low transmission rate such as ISDN. The signal 801 may also be supplied on a large-capacity recording medium such as CD-ROM or DVD (digital versatile disk)-ROM. The above-described structure enables enhanced security.

Meanwhile, the tonal component and the non-tonal component are described with reference to FIG. 13. The rewriting of the dummy data in the high-efficiency coding signal having the dummy data embedded therein may be performed with respect to quantization accuracy information and/or normalization factor information constituting tonal components, quantization accuracy information and/or normalization factor information constituting non-tonal components, or quantization accuracy information and/or normalization factor information constituting both tonal components and non-tonal components.

Figure 18:
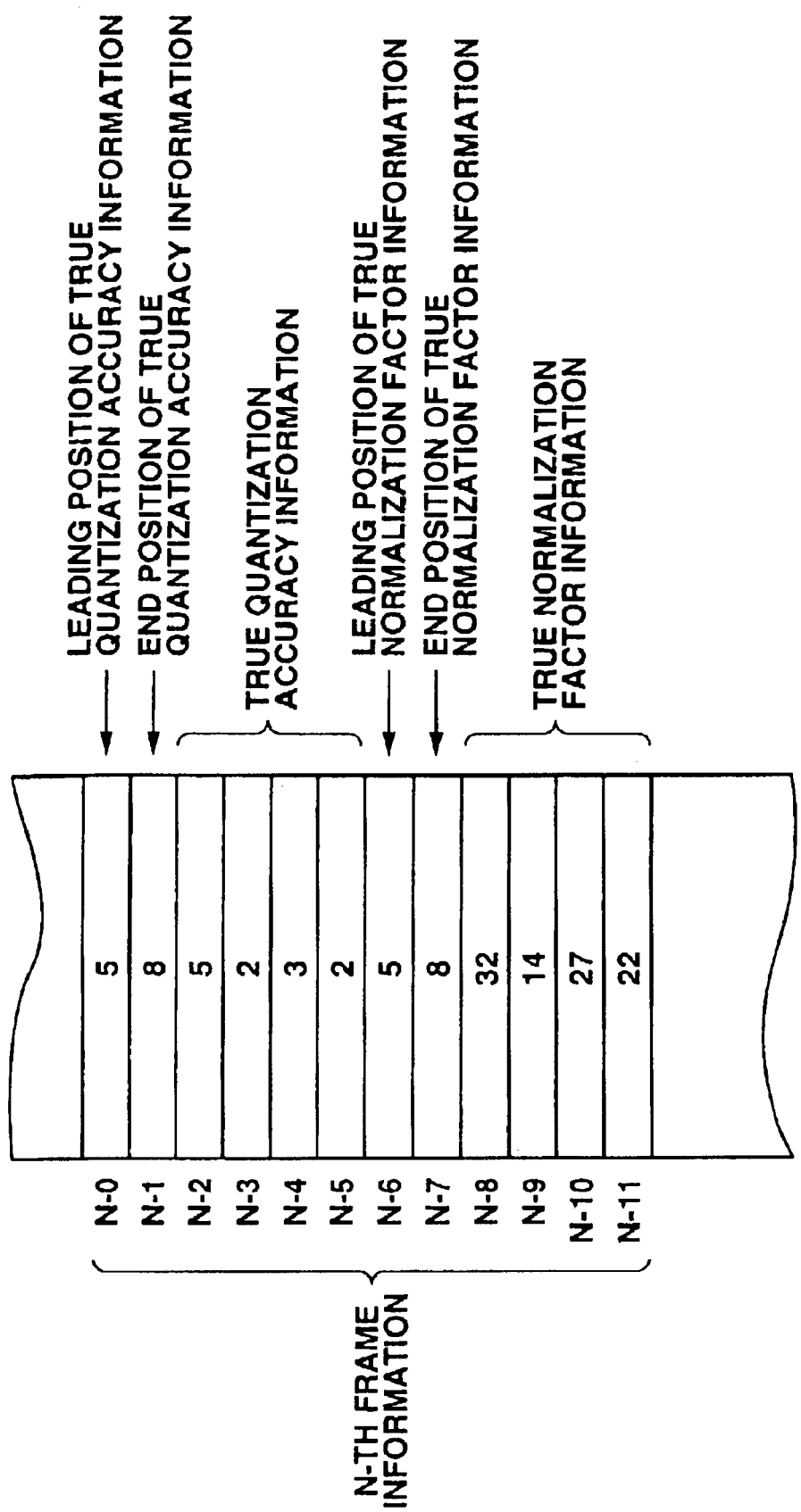
FIG. 18 is a view showing an example of information for replacing dummy data of a code string obtained by the coding method explained with reference to FIG. 15.

FIG. 18 shows a specific example of the format of the true information (second code string) of the signal 807 from the control means 1805 of FIG. 17. This format is for changing the information of the N-th frame shown in FIG. 14 to the information shown in FIG. 9. Thus, with a code string in which there still is dummy data, a reproduced sound having the spectrum shown in FIG. 15 is changed to a reproduced sound having the spectrum shown in FIG. 8.

Figure 19:
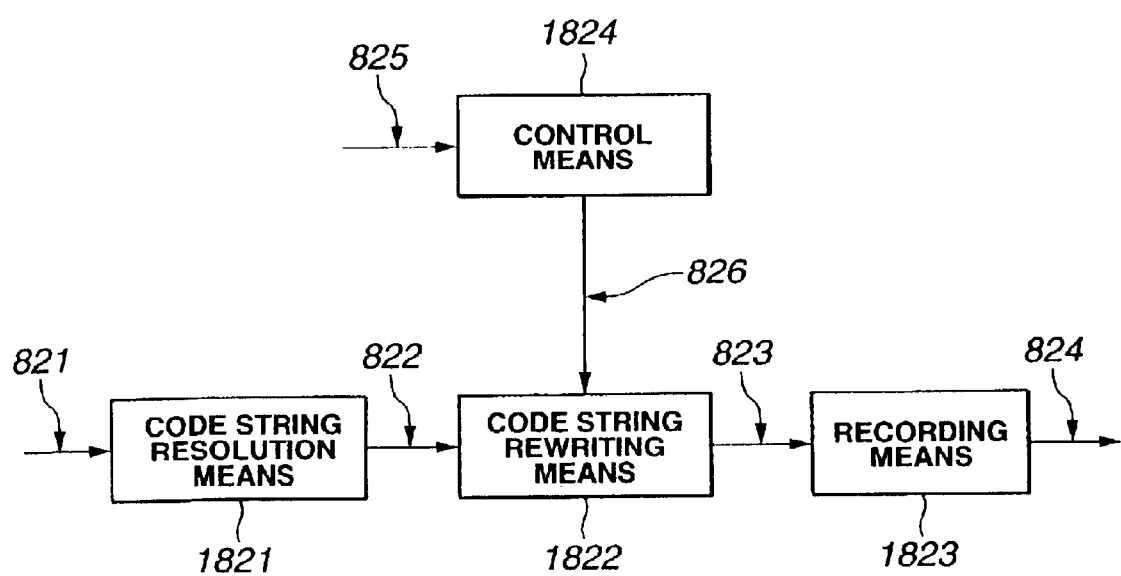
FIG. 19 is a block diagram showing a schematic structure of a recording device used in the embodiment of the present invention.

FIG. 19 is a block diagram showing an example of recording means used in the embodiment of the present invention. In FIG. 19, an input signal 821 is a first code string a part of which is replaced by dummy data. In this case, quantization accuracy information and normalization factor information on the high-frequency side constitute the dummy data. First, the content of the code string of the input signal 821 is resolved by code string resolution means 1821 and sent as a signal 822 to code string rewriting means 1822. The code string rewriting means 1822 receives true quantization accuracy information and normalization factor information 825, which is a second code string, as a signal 826 through control means 1824. The code string rewriting means 1822 rewrites the dummy part of the quantization accuracy information and the normalization factor information of the signal 822 by using the signal 826 and sends a signal 823 as a result of rewriting to recording means 1823, where the signal is recorded to a recording medium. The recording medium for recording the code string of a signal 824 may be a recording medium on which the code string of the signal 821 was originally recorded.

In the embodiment shown in FIG. 19, similarly to the above-described example shown in FIG. 17, at least a part of the dummy data may be rewritten by using a partial code string of the second code string and then recorded, instead of rewriting (complementing) all the dummy data by using the second code string. In the case of thus replacing at least a part of the dummy data by using the partial code string of the second code string and then recording the data, for example, the quality (sound quality or image quality) of the trial viewing/listening can be arbitrarily changed by arbitrarily changing the proportion of the partial code string of the second code string. In this case, even in the trial viewing/listening mode, the partial code string of the second code string is inputted as the signal 825 to the control means 1824 and then sent as the signal 826 to the code string rewriting means 1822. Therefore, a part of the dummy data embedded in the first code string from the code string resolution means 1821 may be rewritten by using the partial code string of the second code string and then sent to the recording means 1823.

The reproducing device and the recording device used in the embodiment of the present invention are described above. It is also possible to encrypt the spectral coefficient information on the high-frequency side to further improve the security. In that case, the code string rewriting means 1802, 1822 for replacing the dummy data, shown in FIGS. 17 and 19, receive the true normalization factor information through the control means 1805, 1824 to replace the dummy data. The code string rewriting means 1802, 1822 also decode the data on the high-frequency side by using a decryption key acquired through the control means 1805, 1824 and reproduce or record the data.

Figure 20:
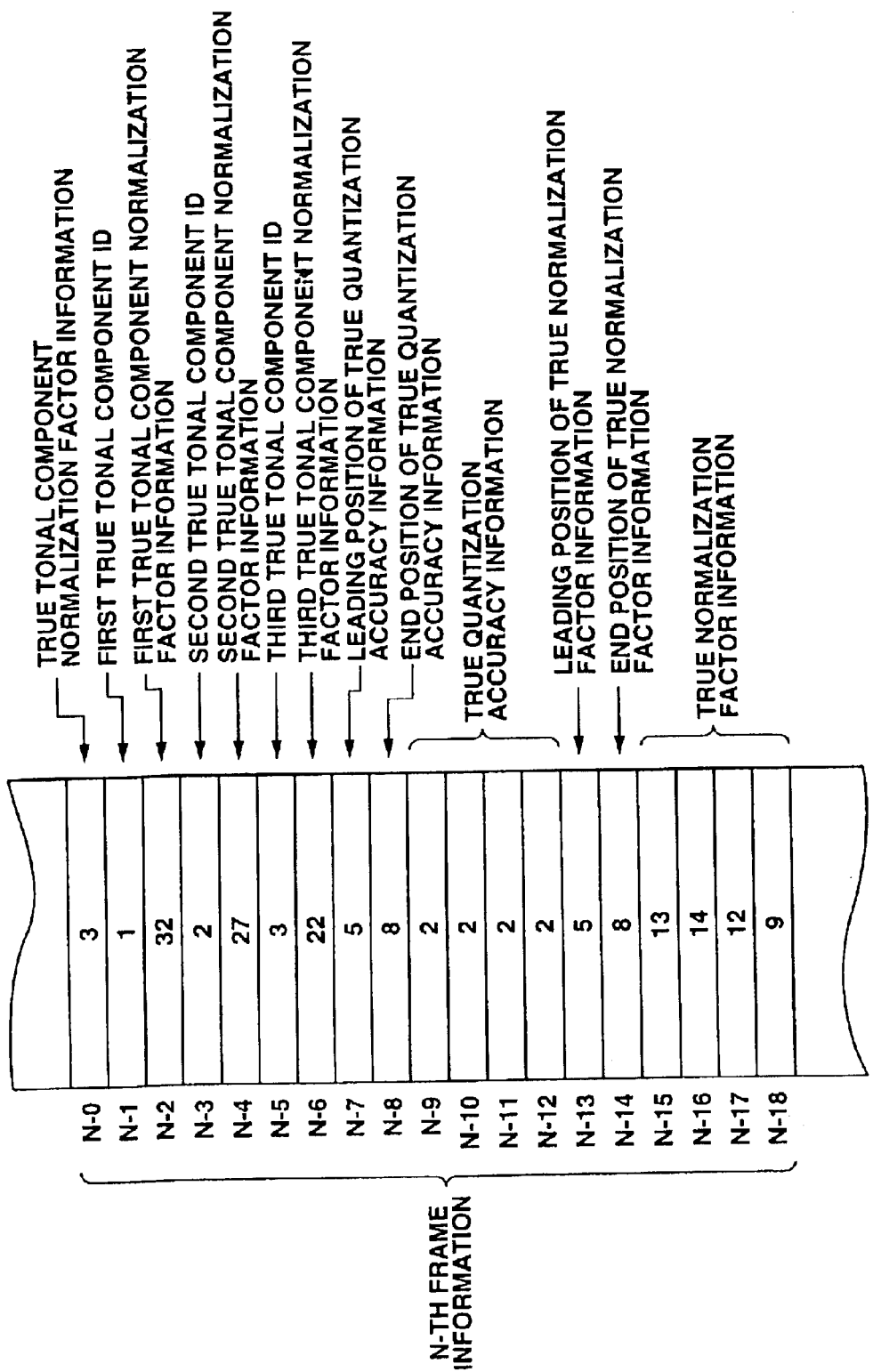
FIG. 20 is a view showing an example of information for replacing dummy data of a code string obtained by a coding method used in another embodiment of the present invention.

FIG. 20 shows a specific example of the format of information for replacing dummy data in the case where a tonal component is separated as shown in FIG. 10 and coded as shown in FIG. 13. Thus, a reproduced sound having the spectrum shown in FIG. 15 is substantially changed to a reproduced sound having the spectrum shown in FIG. 10.

Figure 21:
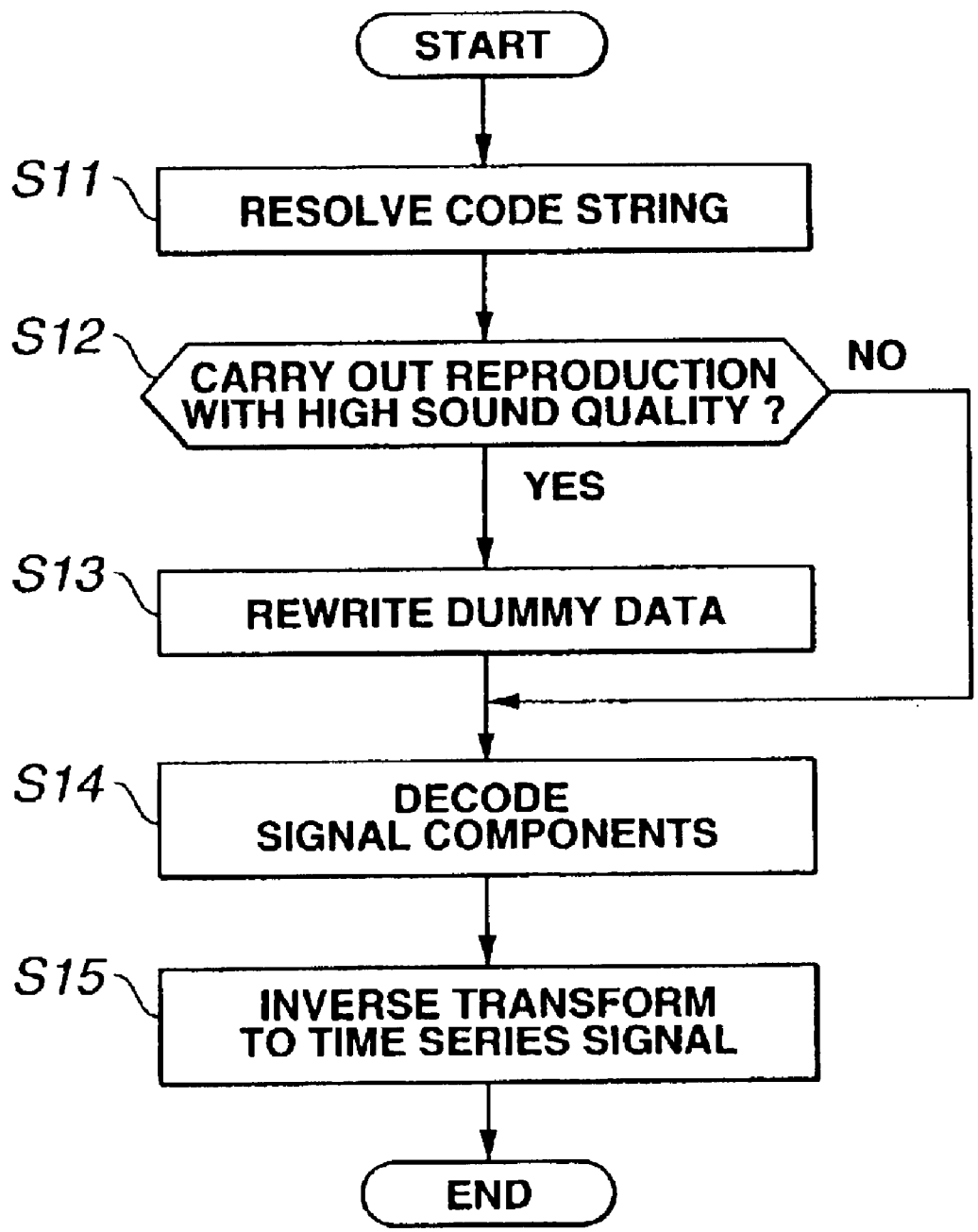
FIG. 21 is a flowchart for explaining a reproducing method used in the embodiment of the present invention.

FIG. 21 is an exemplary flowchart showing the procedure in the case of reproduction using software in accordance with the reproducing method used in the embodiment of the present invention. First, at step S11, a code string (first code string) containing dummy data is resolved, and then at step S12, whether to carry out reproduction with high sound quality is determined. If reproduction with high sound quality is to be carried out, at step S13, the dummy data in the first code string is replaced by true data (second code string) for providing a broad band, and then the procedure goes to step S14. Otherwise, the procedure goes directly to step S14. The signal components are decoded at step S14 and inverse transform to a time series signal to reproduce its sound at step S15.

Figure 22:
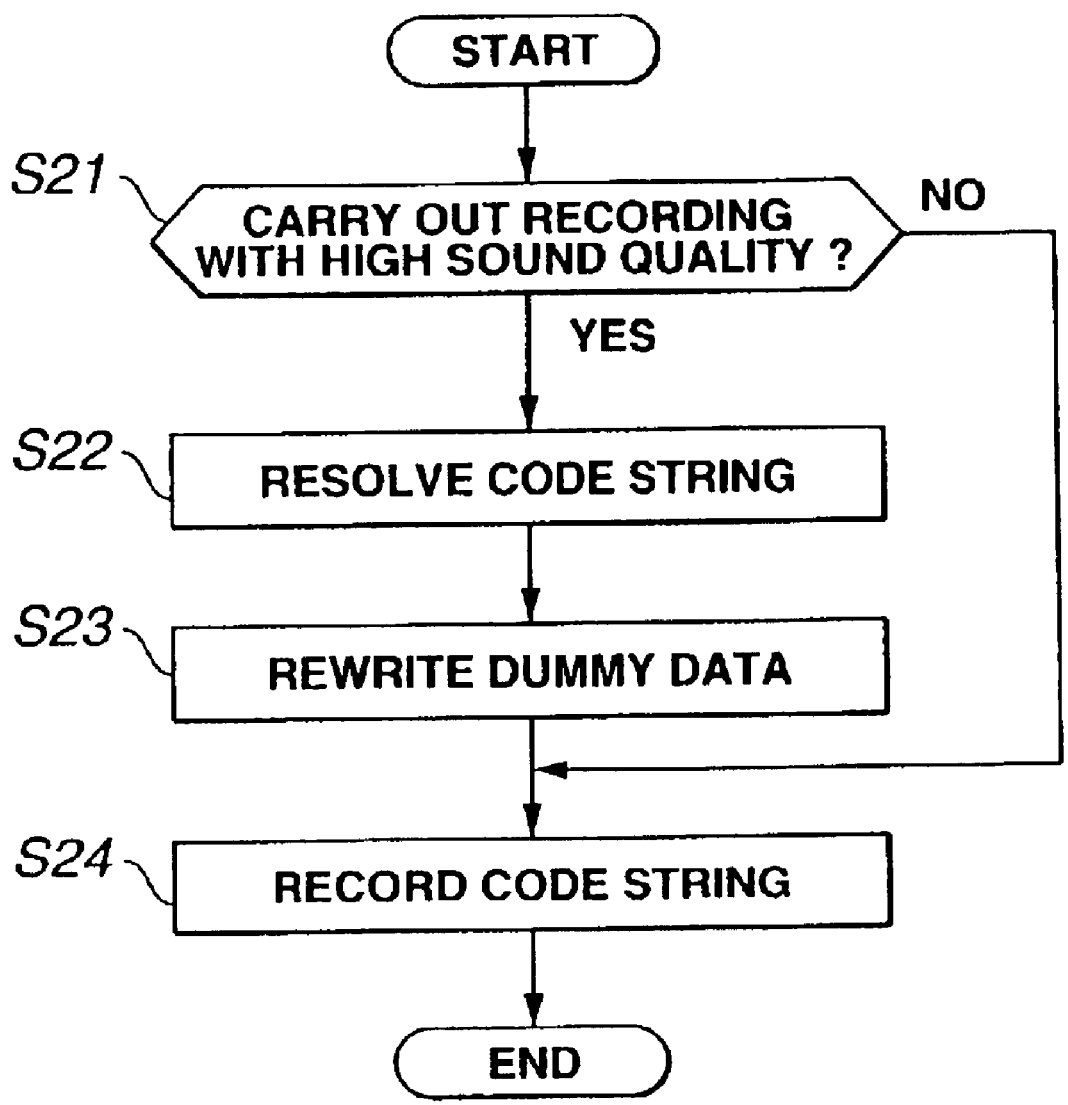
FIG. 22 is a flowchart for explaining a recording method used in the embodiment of the present invention.

FIG. 22 is an exemplary flowchart showing the procedure in the case of recording using software in accordance with the recording method used in the embodiment of the present invention. First, at step S21, whether to carry out recording with high sound quality is determined. If recording with high sound quality is to be carried out, first, at step S22, a code string (first code string) containing dummy data is resolved, and then at step S23, the dummy data in the code string is replaced by true data (second code string) for providing a broad band. The procedure then goes to step S24. Otherwise, the procedure goes directly to step S24 from step S21.

Meanwhile, in the above-described embodiment, a part of data of a code string is replaced by dummy data such as 0 without changing the structure of the code string of a predetermined format obtained by coding a signal, that is, in conformity with the existing code string format standard. However, it is also possible to remove the dummy data part and thus shorten the code string.

Figure 23:
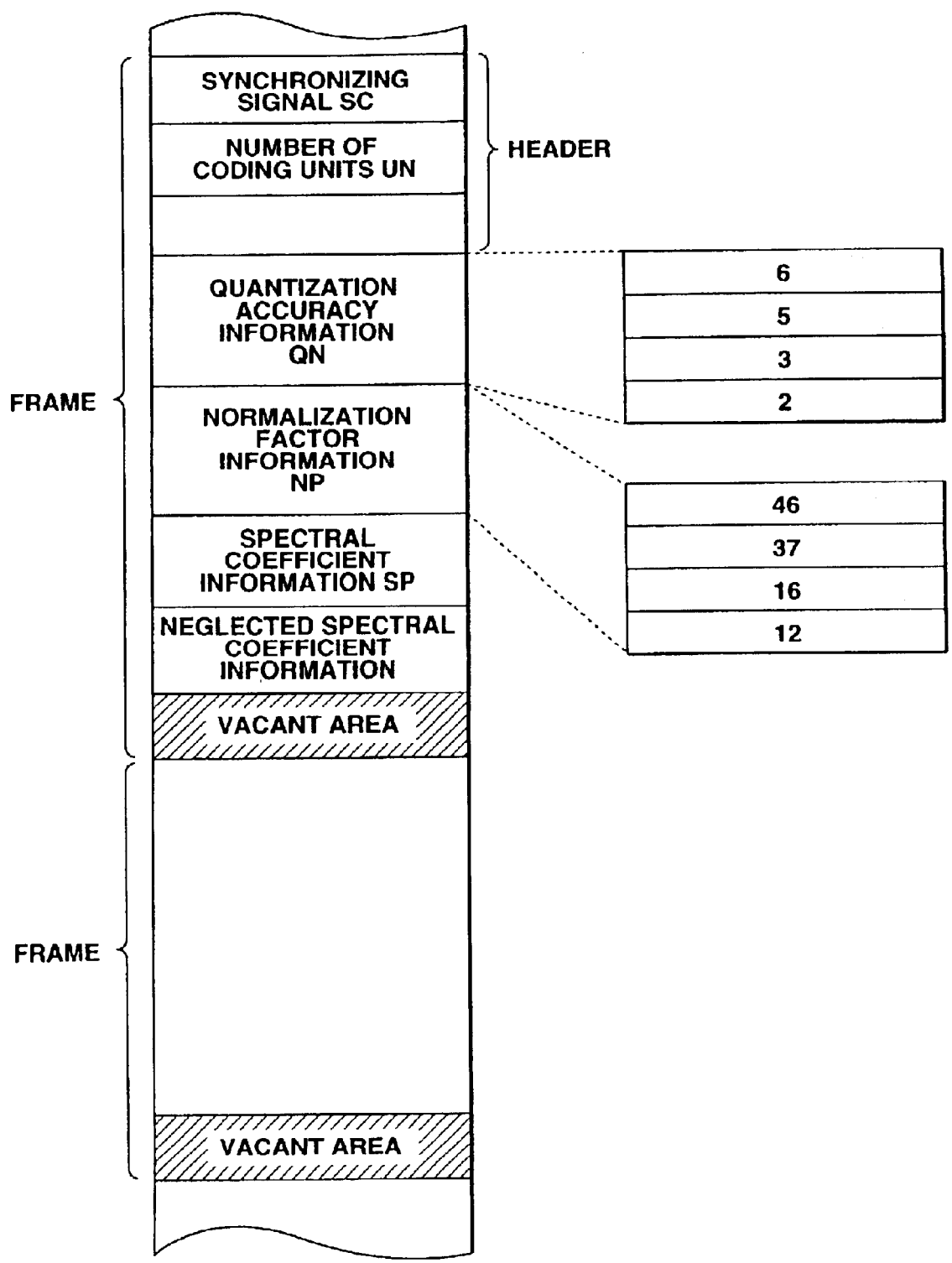
FIG. 23 is a view showing an exemplary code string obtained by another coding method used in the embodiment of the present invention.

Specifically, FIG. 23 shows a code string such that dummy quantization accuracy data (0) of the quantization accuracy information QN the dummy normalization factor data (0) of the normalization factor information NP in the code string shown in FIG. 14 are deleted and the remaining part is moved over to shorten the code string. In this case, information of the number of units of the dummy data must be written in the code string. For example, the number of dummy coding units may be written instead of the number of coding units UN, or the number of dummy coding units may be written in a reserved area or the like.

If the dummy data is left as in the example shown in FIG. 14, when later complementing the code string data by using the second code string, the dummy data part is overwritten by the second code string. On the other hand, in the example shown in FIG. 23, processing to insert the second code string into the part where the dummy data was deleted is necessary. However, the example of FIG. 23 is advantageous in that a smaller quantity of data may be transmitted or recorded because the length of the code string is shorter by the length of the dummy data of FIG. 14.

As is apparent from the above description, in the coding method used in the embodiment of the present invention, a signal having a narrow reproducing band is reproduced as dummy data such as normalization factor data or the like is written for each frame. However, it is also possible to change the reproducing band using this dummy data such as normalization factor data, depending on each part of a tune.

If trial viewing/listening is of low quality (sound quality or image quality), the quality of a signal that can be enjoyed after the purchase is unknown and it is difficult to determine whether to purchase or not. However, if trial viewing/listening of relatively high quality is possible, the quality of the reproduced signal of the first code string is changed with the lapse of time so that only a part of the reproduced signal may be reproduced with high quality, considering that more users may think they can sufficiently enjoy the signal without purchasing.

Specifically, for example, in the frames of the leading part of a tune and the most impressive part of the tune, coding is performed without using dummy data such as normalization factor data so as to enable reproduction of a broad band, whereas in the frames of the other parts, dummy data such as normalization factor data is used to perform narrow-band reproduction. By smoothly changing the reproducing band over several frames, it is possible to reduce the unnaturalness in the trial listening (in general, trial viewing/listening).

Figure 24:
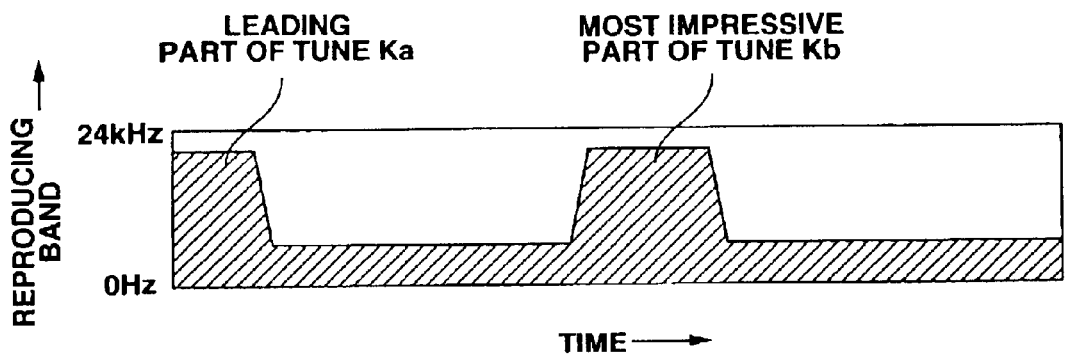
FIG. 24 is a view for explaining a change with the lapse of time of the code string used in the embodiment of the present invention.

FIG. 24 shows a change of the reproducing band in this trial listening based on this method. The reproducing band is broadened in the leading part Ka and the most impressive part Kb of a tune, and for example, the intermediate/high-frequency band cannot be reproduced in the other parts because of the dummy data.

To generalize this, when generating a first code string of a trial viewing/listening code string, the value of a control parameter for the quality (sound quality or image quality) of the reproduced signal of the first code string for trial viewing/listening is changed with the lapse of time. This reproduction quality control is carried out by embedding dummy data into the code string and the bandwidth of the coded signal may be used as a reproduction quality control parameter. In the case where, when reproducing a code string of a predetermined format obtained by coding a signal, at least a part of dummy data of a first code string made through replacing at least a part of the code string of the predetermined format with the dummy data is rewritten by using a partial code string of a second code string for complementing the dummy data part, and the code string obtained by the rewriting with the partial code string of the second code string is decoded, spectral transform of the input signal and division of its band are performed in the coding, thus generating the code string of the predetermined format comprising quantization accuracy information, normalization factor information and spectral factor information for each band. The dummy data corresponds to the information of at least the high-frequency side of at least one of the quantization accuracy information, the normalization factor information and the spectral coefficient information. The partial code string of the second code string is the information of at least the low-frequency side of the information corresponding to the dummy data, and its band changes with the lapse of time.

Figure 25:
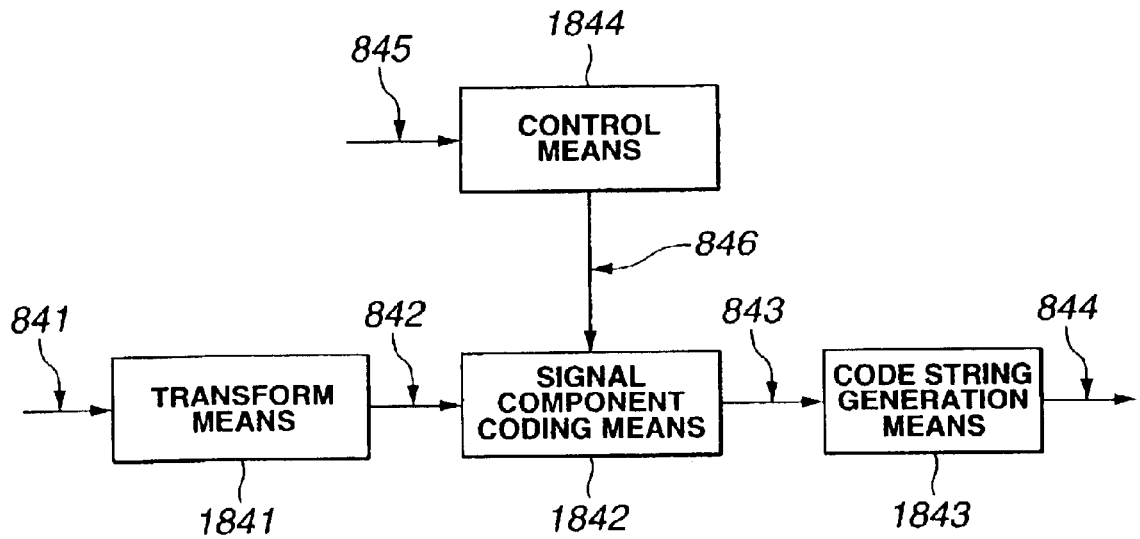
FIG. 25 is a block diagram showing an exemplary coding device used in the embodiment of the present invention.

FIG. 25 is a block diagram showing a specific example of a coding device for changing the quality of a reproduced signal depending on each part of the tune. In FIG. 25, control means 1844 receives information 845 of the leading part and the most impressive part of the tune and controls signal component coding means 1842 to use dummy data such as normalization factor data, thus changing the reproducing band.

The other parts of FIG. 25 are similar to those of FIG. 2. That is, after an inputted waveform signal 841 is transformed to signals 842 of signal frequency components by transform means 1841, each component is coded by the signal component coding means 1842 and a code string 844 is generated by code string generation means 1843.

Figure 26:
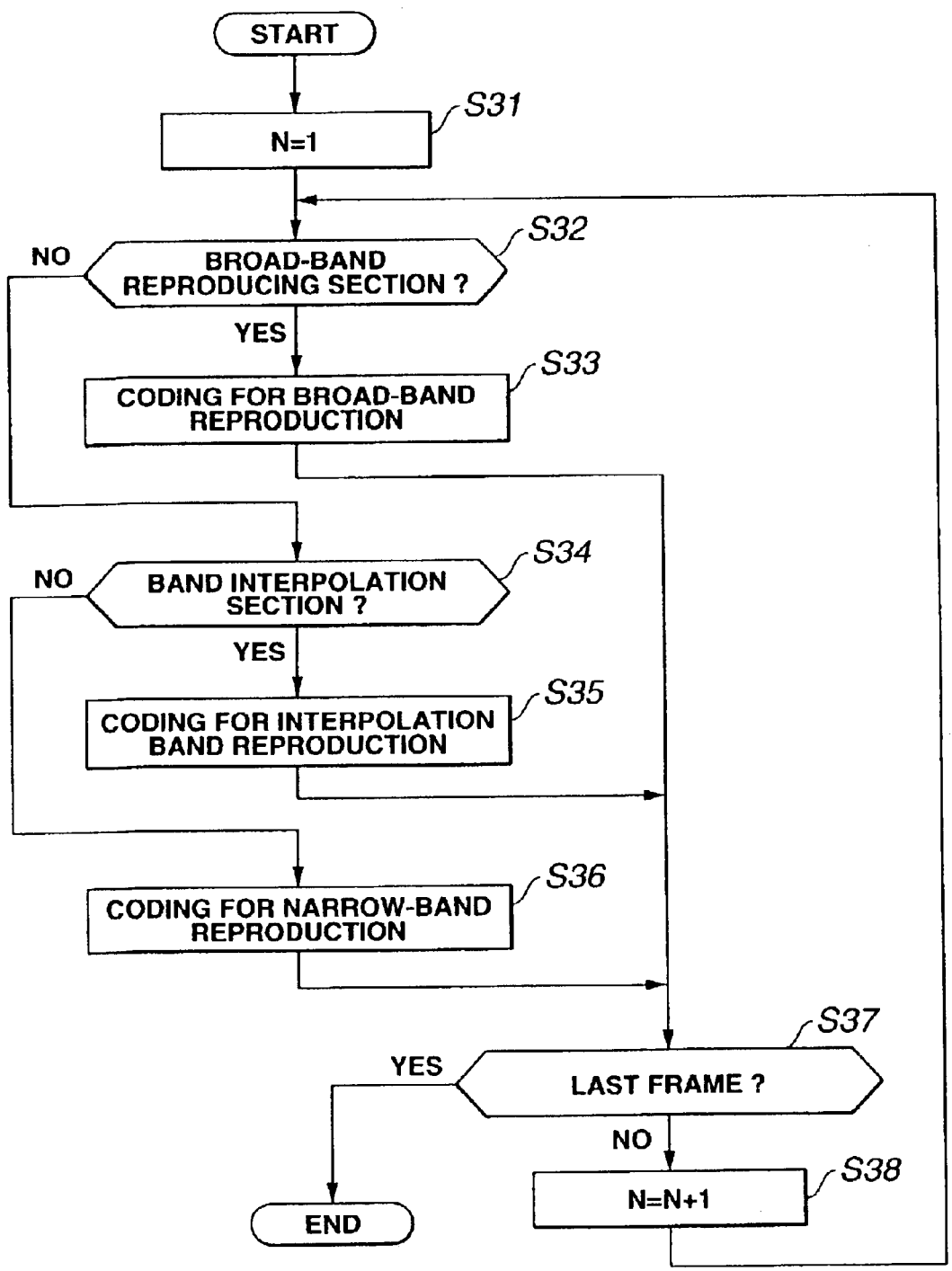
FIG. 26 is a flowchart for explaining the coding method used in the embodiment of the present invention.

FIG. 26 is a flowchart showing the flow of a specific example of the processing by the control means 1844 FIG. 25 to change the reproducing band. First, the frame number N is set to 1 at step S31 and then the processing goes to step S32. At step S32, it is determined whether or not the current frame is a broad-band reproducing section such as the leading part or the most impressive part. If the current frame is a broad-band reproducing section, at step S33, coding is carried out without using dummy data such as normalization factor data so as to carry out broad-band reproduction, and the processing goes to step S37. Otherwise, the processing goes to step S34. At step S34, it is determined whether or not the current frame is a band interpolation section before or after a broad-band reproducing section. If the current frame is a band interpolation section, at step S35, coding is carried out using dummy data such as normalization factor data so that the reproducing band gradually changes, and the processing goes to step S37. Otherwise, the processing goes to step S36. At step S36, coding is carried out using dummy data such as normalization factor data so as to perform narrow-band reproduction, and the processing goes to step S37. At step S37, it is determined whether the current frame is the last frame or not. If the current frame is the last frame, the processing ends. Otherwise, at step S38, the value of the frame number N is increased by 1 to shift to the next frame, and the processing goes back to step S32.

In this example, dummy data such as normalization factor data is used for controlling the reproducing band in each frame. However, encryption of the high-frequency side may also be used for controlling the reproducing band, as described in the Japanese Publication of Unexamined Patent Application No.H10-135944 proposed by the present inventors.

Figure 27:
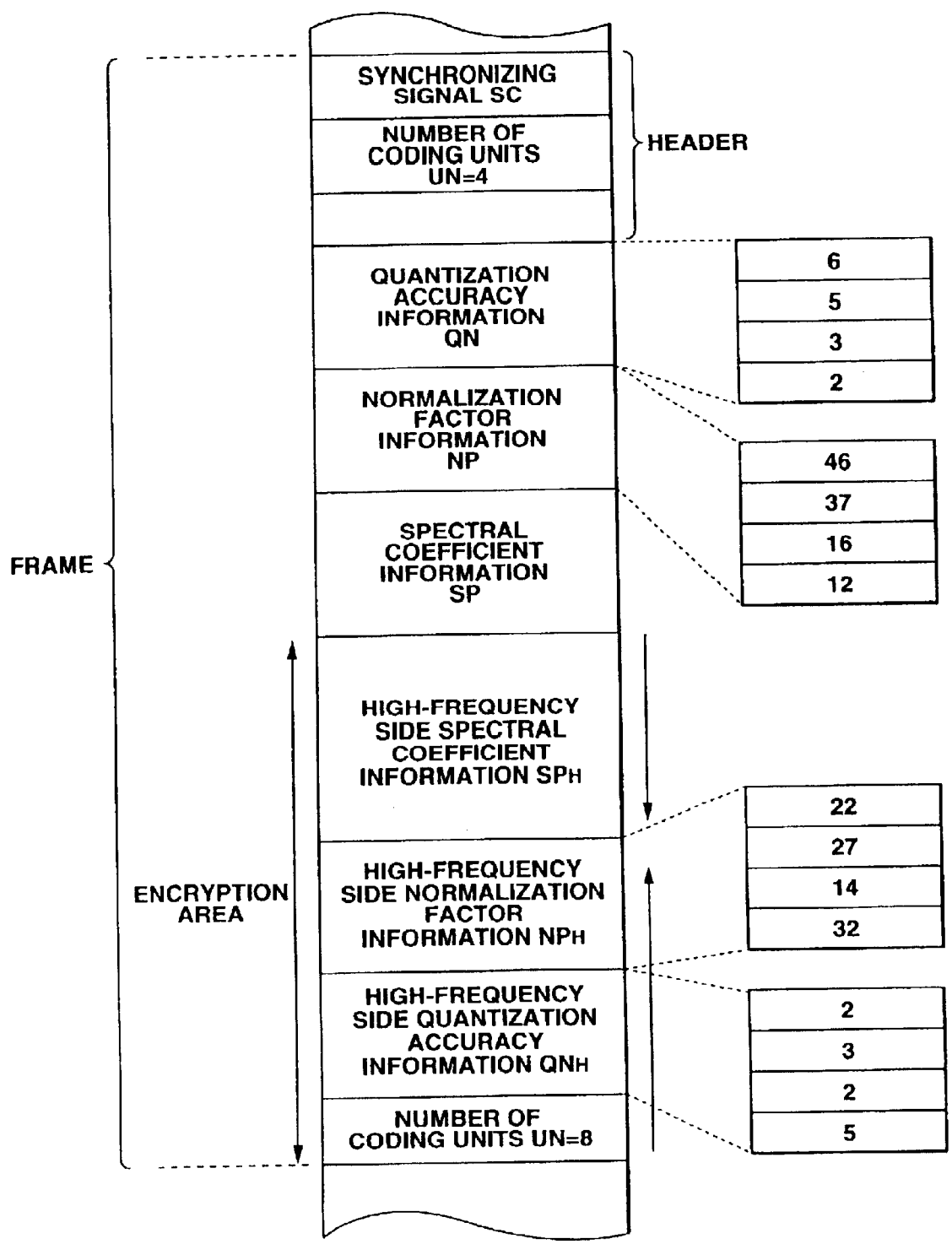
FIG. 27 is a view for explaining the processing to extract only a high-quality part in the case where the reproduction quality of the code string changes with the lapse of time.

FIG. 27 shows a method for encrypting the high-frequency side of each frame by using a technique similar to the technique described in the Japanese Publication of Unexamined Patent Application No.H10-135944. In the specific example shown in FIG. 27, spectral coefficient information $SP_H$ on the high-frequency side, normalization factor information $NP_H$ on the high-frequency side, quantization accuracy information $QN_H$ on the high-frequency side, and the number of coding units UN thereof are encrypted.

By thus limiting the band and changing the bandwidth available for trial listening with the lapse of time as shown in FIG. 24, another method of the embodiment of the present invention is made possible. Thus, again, it is possible to enjoy a tune with high sound quality by carrying out decryption after confirming the sound quality and the content of the tune.

Meanwhile, in the case where broad-band reproduction is made possible in the frames of, for example, the leading part of the tune and the most impressive part of the tune so that the quality of the reproduced signal changes with the lapse of time, as described above with reference to FIG. 24, it is preferred that the time of trial viewing/listening can be shortened by extracting and reproducing only the leading part and the most impressive part and that the user can select such a short-time trial viewing/listening mode or a trial viewing/listening mode for the entire content.

That is, when a code string such that the quality of the reproduced signal changes with the lapse of time is used as the first code string having the dummy data embedded therein, a part on the time axis of the reproduced signal of the first code string with its quality being within a predetermined range may be extracted and reproduced.

Figures 28A, 28B:
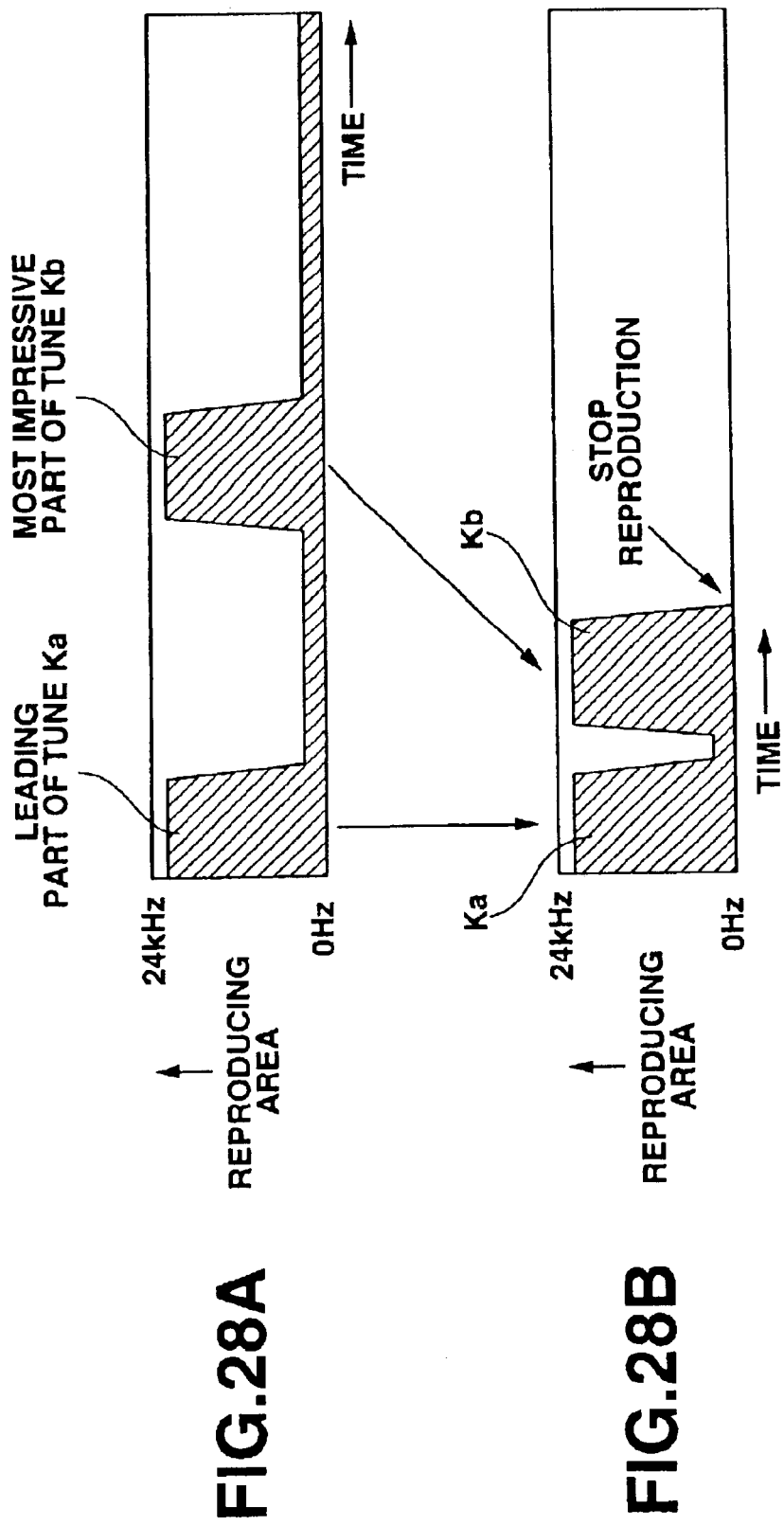
FIGS. 28A and 28B are views for explaining other coding methods used in the embodiment of the present invention.

A specific example is shown in FIGS. 28A and 28B. In FIG. 28A, similar to FIG. 24, the reproducing band is broadened with the lapse of time in a part of a tune, for example, th leading part Ka of the tune and the most impressive part Kb of the tune, and for example, the intermediate/high-frequency band cannot be reproduced in the other parts because of the dummy data. With respect to such a tune having a reproducing band changing with the lapse of time, the content of the tune can be confirmed in a short trial listening time by extracting and reproducing the parts having the broad band, that is, the leading part Ka and the most impressive part Kb of the tune, as shown in FIG. 28B.

The trial viewing/listening in the embodiment of the present invention and the exemplary method for improving its quality are described above. Hereinafter, a content supply system using the embodiment of the present invention will be described.

Figure 29:
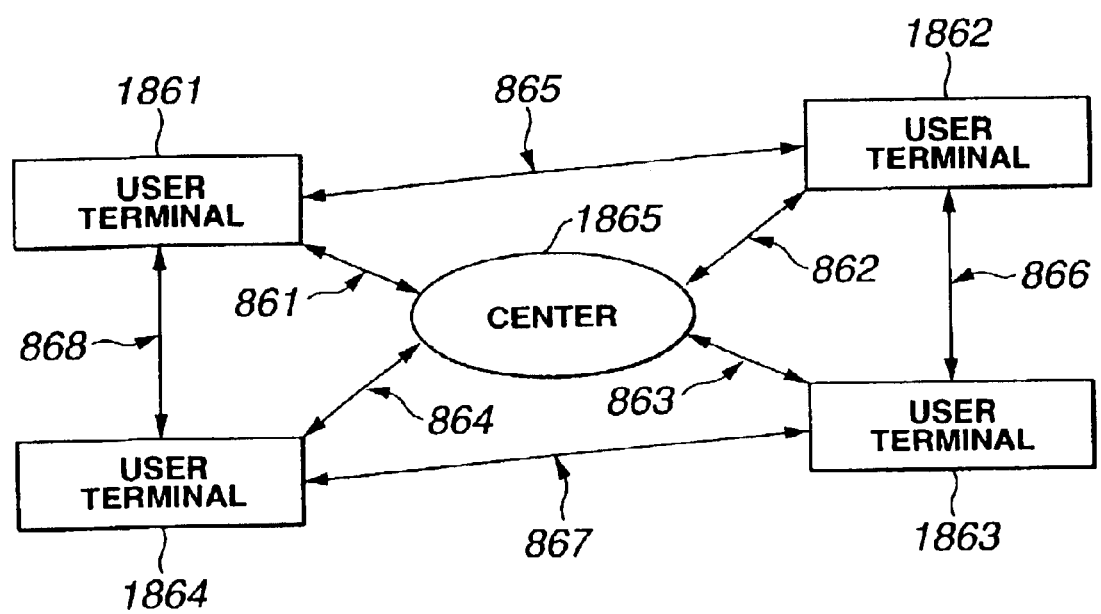
FIG. 29 is a block diagram for explaining a content supply system constituted by using the embodiment of the present invention.

FIG. 29 is a view for explaining the content supply system using the embodiment of the present invention. In FIG. 29, a center (content supply center) 1865 for storing and managing contents and user terminals 1861 to 1864 used by respective users are connected by networks (861 to 868). The user terminals 1861 to 1864 are directly connected to the center 1865.

Figure 30:
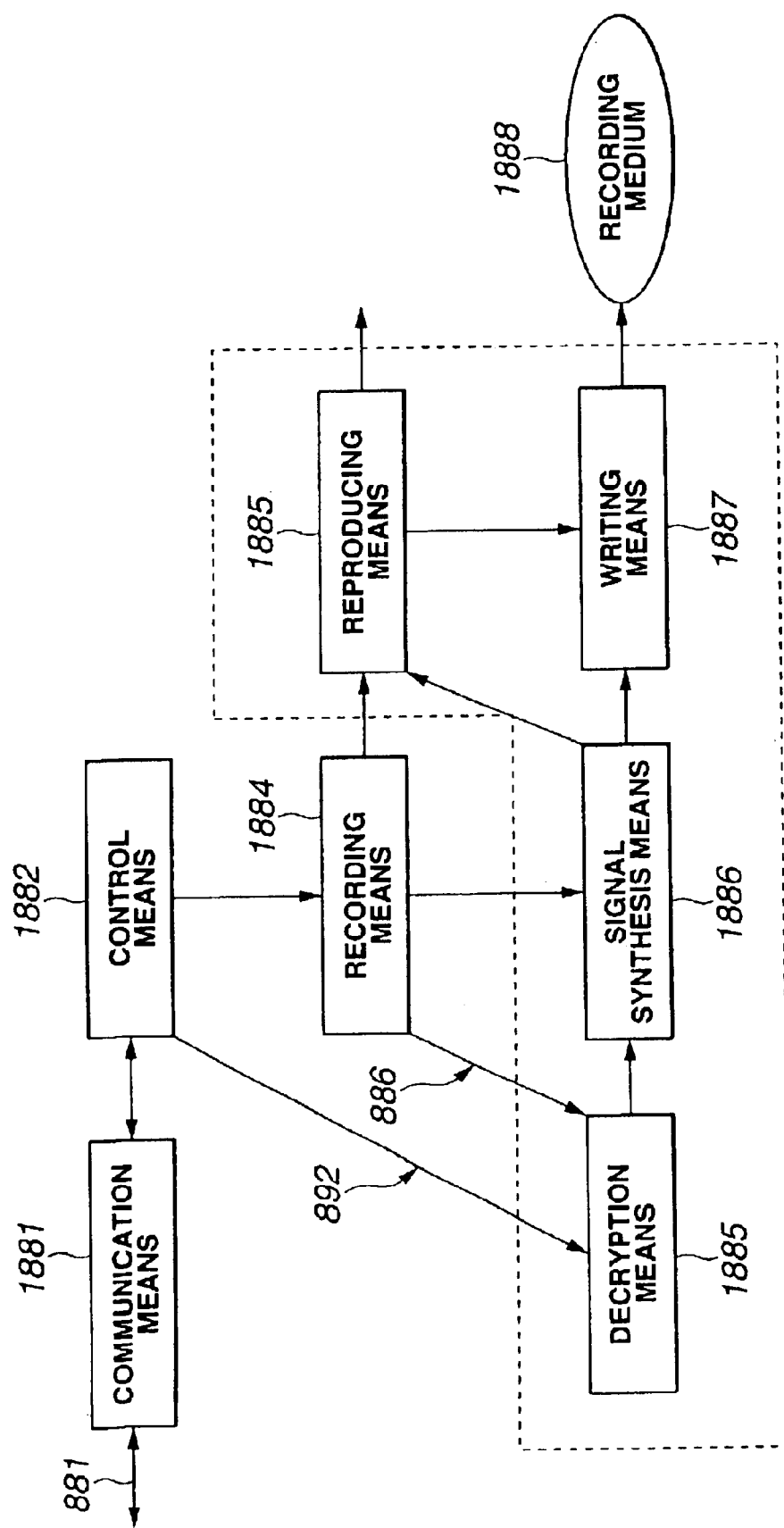
FIG. 30 is a block diagram showing an exemplary user terminal used in the content supply system of FIG. 29.

FIG. 30 is a block diagram showing a specific example of the user terminal. The user terminal has communication means 1881 for performing communication using a signal 881 to and from the center and the other user terminals, and control means 1882 for controlling such communication. The user terminal also has recording means 1884 capable of recording trial listening data using dummy data sent from the center, and reproducing means 1885. Thus, each user can listen to the trial listening data sent from the center, many times. For example, the user may reproduce trial listening data sequentially sent from the center during the night, with relatively low sound quality as background music during the day.

Meanwhile, the user terminal has signal synthesis means 1886 and writing means 1887. Thus, the user can synthesize trial listening data containing dummy data and high-sound-quality data made up of not dummy data but true normalization factor information and the like, and can reproduce the high-quality audio signal using the reproducing means 1885 or record the high-quality audio signal to a recording medium 1888 via the writing means 1887. The high-sound-quality data is purchased by the user via the control means 1882 if the user likes a specific tune. The high-sound-quality data is sent in an encrypted state from the center, temporarily recorded to the recording means 1884, and then sent to decryption means 1883.

The decryption means 1883 decrypts encrypted high-sound-quality data 886 by using a decryption key 892 sent from the control means 1882 and sends the decrypted data to the signal synthesis means 1886. In view of the protection of data, it is desired that the decryption means 1883, the signal synthesis means 1886, the writing means 1887 and the reproducing means 1885 are integrated in terms of hardware.

Figure 31:
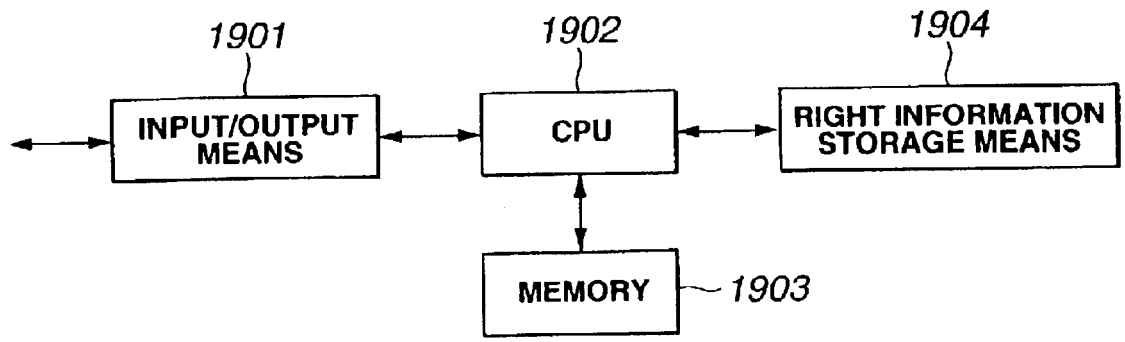
FIG. 31 is a block diagram showing an example of control means of the user terminal of FIG. 30.

FIG. 31 is a block diagram showing a specific example of the control means of FIG. 30. This control means has right information storage means 1904 as well as a CPU 1902, a memory 1903 and input/output means 1901. Token information is stored in the right information storage means 1904. This token information is purchased by a user paying its fee in advance. The token information is reduced every time a tune is purchased. Such right information storage means 1904 can be realized by using, for example, an IC card. The method for improving the sound quality of each tune, that is, the method for settlement of the purchase of the tune, may be a method other than such a prepaid method, for example, a credit card method.

In the specific example of FIG. 29, the trial listening data containing dummy data is distributed by using the same network as the high-sound-quality data. However, this is not necessarily required and distribution via broadcast or CD-ROM which enables easy transmission of a large quantity of data may be used.

In the case where the distribution of trial listening data from the center to the user terminal is separately carried out by using a network or the like, a database is provided at the center and trial listening data of tunes of a genre from which the user purchased high-sound-quality data may be sent to the user intensively.

In this manner, in the content supply system using the embodiment of the present invention, content data for trial viewing/listening is sent for free or at a low price from the center to the user terminal. The user terminal reproduces the contents for trial viewing/listening and the user selects and purchases only the content that the user likes, thus enabling reproduction with high quality. The reception of the contents for trial viewing/listening may be carried out on the basis of membership for free or at a low price.

Figure 32:
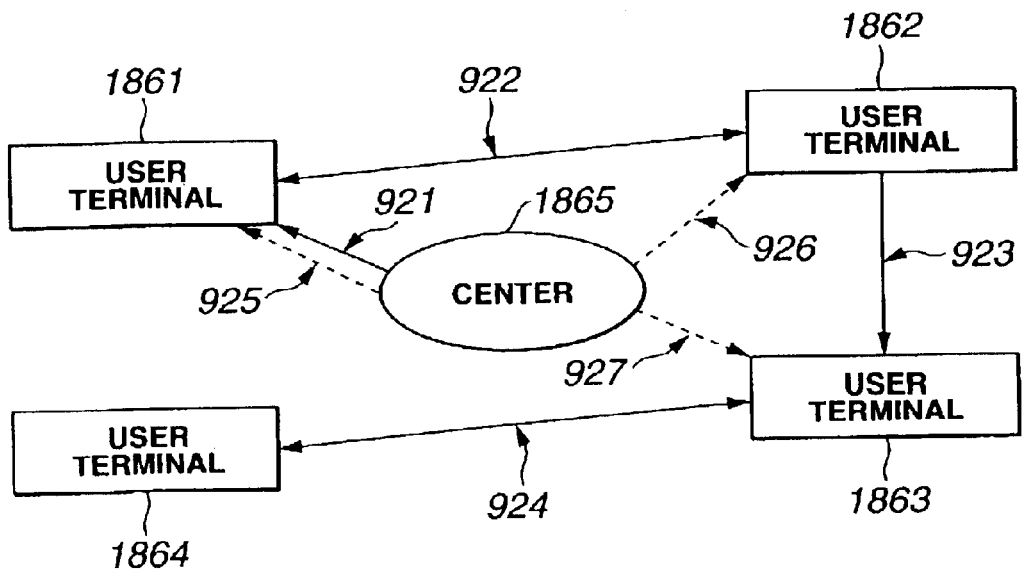
FIG. 32 is a block diagram for explaining a content supply system constituted by using another embodiment of the present invention.

FIG. 32 is a view for explaining another example of the content supply system using the embodiment of the present invention. In FIG. 32, a center (content supply center) 1865 and the user terminals 1861 to 1864 are the same as those of FIG. 29. First, the user terminal 1861 receives, from the center, trial listening data 921 containing dummy data and reproduced with relatively low sound quality. If the user of the user terminal 1861 likes this tune, the user purchases high-sound-quality data 925 obtained by replacing the dummy data with true data. The user sends a copy 922 of the data 921 to the user terminal 1862, considering that also the user of the user terminal 1862 likes this tune. In this case, the user of the user terminal 1862 can receive this trial listening data 922 for free or at a low price and reproduce the trial listening data 922. If the user of the user terminal 1862 likes this tune, the user purchases high-sound-quality data 926 of the same content as the data 925 from the center 1865.

Similarly to the user of the user terminal 1861, the user of the user terminal 1862 sends a copy 923 of the data 922 to the user terminal 1863, considering that also the user of the user 1863 likes this tune. In this case, too, the user of the user terminal 1863 can receive this copy for free or at a low price. If the user of the user terminal 1863 likes this tune, the user can purchase high-sound-quality data 927 of the same content as the data 925 from the center 1865. The user of the user terminal 1863 can also send a copy 924 of the data 923 to the user terminal 1864.

In this another example of the content supply system using the embodiment of the present invention, similar copying of the trial listening data for free or at a low price among the users is permitted and only the user who listens to and likes the tune will purchase the high-sound-quality data and listen to the tune with high sound quality. In this case, the user purchases the high-sound-quality data with respect to the trial listening data having dummy data. However, a key for decrypting encrypted high-frequency data may be purchased, as in the technique described in the Japanese Publication of Unexamined Patent Application No.H10-135944.

Figure 33:
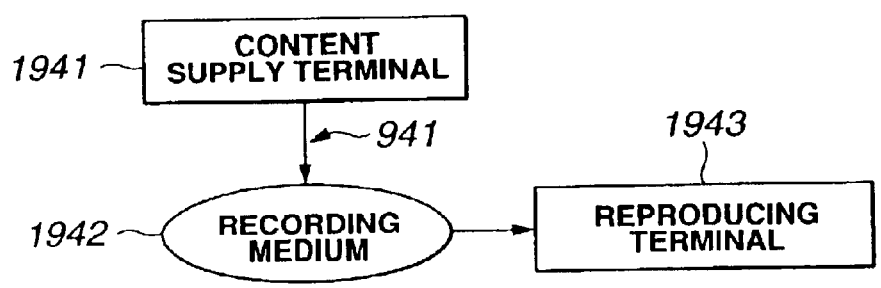
FIG. 33 is a block diagram for explaining a content supply system constituted by using still another embodiment of the present invention.

FIG. 33 is a view for explaining still another example of the content supply system using the embodiment of the present invention. In this system, first, trial listening data 941 with its band narrowed, for example, by using dummy data, is written to a recording medium 1942 for free or at a low price from a content supply terminal 1941 such as an a vending machine installed at a convenience store or a so-called kiosk, and the recording medium 1942 is loaded on a reproducing terminal 1943 to reproduce the data. The reception of the content for trial listening viewing/listening may be carried out on the basis of membership for free or at a low price.

Figure 34:
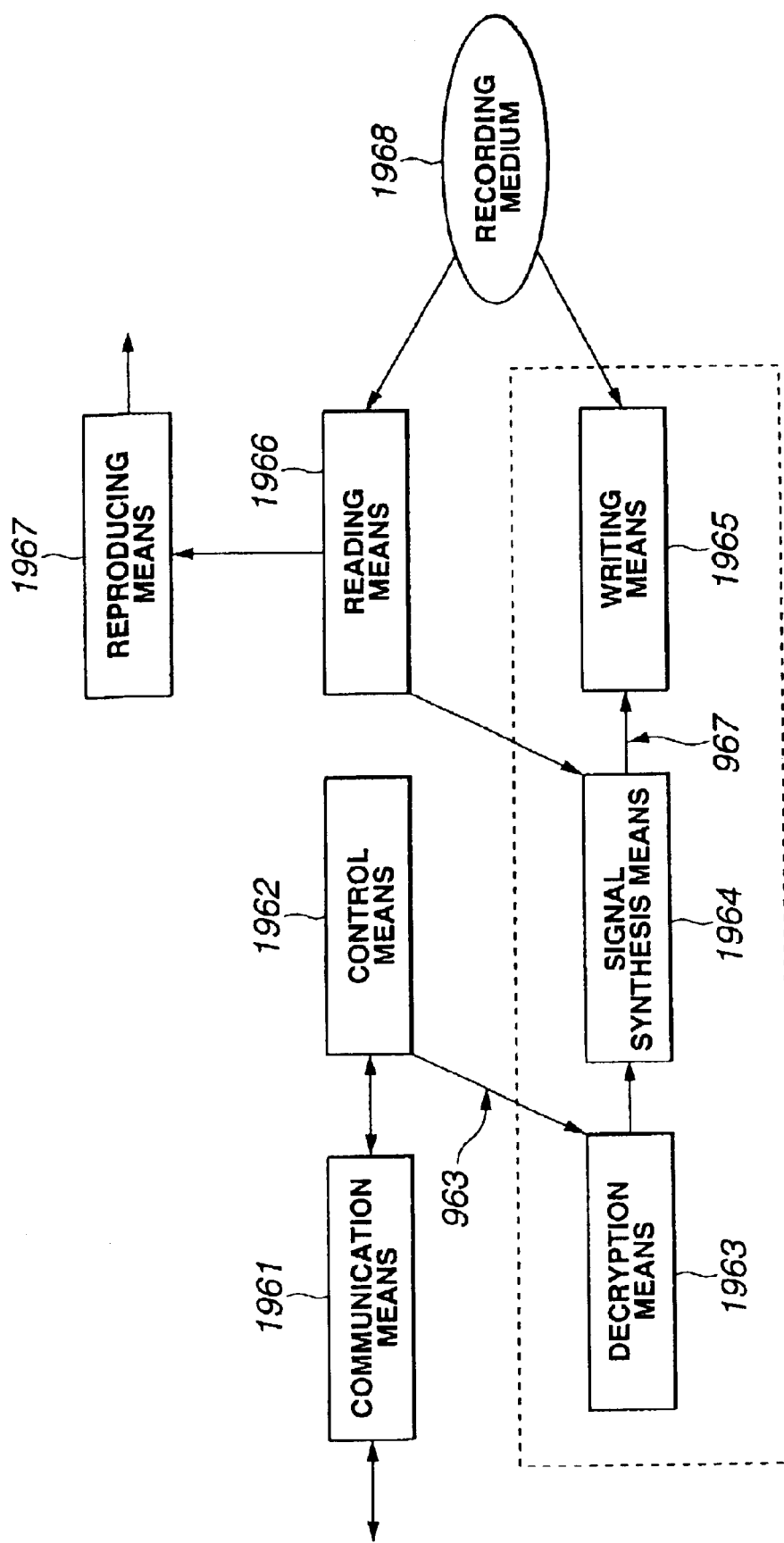
FIG. 34 is a block diagram for explaining a reproducing terminal used in the content supply system of FIG. 33.

FIG. 34 is a block diagram showing a specific example of the reproducing terminal of FIG. 33. A recording medium 1968 is the same as the recording medium 1942 of FIG. 33. This reproducing terminal also has a recording function, as will be described later. The content of trial listening data recorded on the recording medium may be reproduced as much as the user likes, by using reading means 1966 and reproducing means 1967. If the user likes this tune, the user purchases high-sound-quality data 963 through communication means 1961 under the control of control means 1962. This high-sound-quality data 963 has been encrypted similarly to the example of FIG. 30. The high-sound-quality data 963 is decrypted by decryption means 1963 and then synthesized by signal synthesis means 1964 with trial listening data containing dummy data temporarily read out from the recording medium by the reading means 1966. High-sound-quality data 967 thus obtained is written to the recording medium 1968 by writing means 1965.

In view of the protection of data, it is desired that the decryption means 1963, the signal synthesis means 1964 and the writing means 1965 are integrated in terms of hardware.

As a method for settlement at the time of purchase, the same method as in the case of FIG. 30 may be applied. In this example, the user purchases the high-sound-quality data with respect to the trial listening data having dummy data. However, a key for decrypting encrypted high-frequency data may be purchased, as in the technique described in the Japanese Publication of Unexamined Patent Application No.H10-135944. That is, in the content supply system described with reference to FIGS. 33 and 34, content data for trial viewing/listening downloaded for free or at a low price from a kiosk terminal or the like is recorded to a recording medium. The user reproduces the contents, selects only the content that the user likes, and purchases its high-sound-quality data, thus enabling reproduction with high quality.

If the reproducing terminal of FIG. 33 is to perform only trial viewing/listening, the reproducing terminal need not have the communication means 1961, the decryption means 1963, the signal synthesis means 1964, the writing means 1965 and the like as in the reproducing terminal of FIG. 34. The sound quality may be improved by a terminal as shown in FIG. 34 after trial listening is sufficient carried out by ordinary reproducing means for the recording medium 1942.

While audio signals are used in the above-described embodiment, the present invention can also be applied to image signals. Specifically, for example, in the case where an image signal is transformed for each block by using two-dimensional DCT and quantized by using various quantization tables, a dummy quantization table having high-frequency components eliminated therefrom is designated, and the dummy quantization table is replaced by a true quantization table having high-frequency components therein when improving the image quality. Thus, it is possible to perform processing similar to the case of audio signals.

The present invention can also be applied to a system in which an entire code string is encrypted and the encrypted code string is decrypted during reproduction.

While a coded bit stream is recorded to a recording medium in the above-described embodiment, the method of the present invention may also be applied to the case of transmitting a bit stream. Thus, for example, only a listener who acquired a true normalization factor over the entire band may be allowed to reproduce a broadcast audio signal with high sound quality, while the other listeners can sufficiently grasp the content but can only reproduce the audio signal with relatively low sound quality.

What is claimed is:

1. A signal processing system for a code string of a predetermined format obtained by coding a signal, the system comprising:

first code string generation means for generating a first code string by replacing a part of the code string of the predetermined format with dummy data;

second code string generation means for generating a second code string for complementing the dummy data part of the first code string;

first code string provision means for providing the first code string;

second code string provision means for providing the second code string;

rewriting means for rewriting the dummy data of the first code string received from the first code string provision means to the second code string received from the second code string provision means; and switching means for switching and outputting the first code string and the code string from the rewriting means in accordance with a predetermined condition;

wherein the code string of the predetermined format comprises normalization factor information of the signal; and the dummy data comprises dummy data corresponding to at least a part of the normalization factor information.

2. A signal processing system for a code string of a predetermined format obtained by coding a signal, the system comprising:

first code string generation means for generating a first code string by replacing a part of the code string of the predetermined format with dummy data;

second code string generation means for generating a second code string for complementing the dummy data part of the first code string;

first code string provision means for providing the first code string;

second code string provision means for providing the second code string;

rewriting means for rewriting the dummy data of the first code string received from the first code string provision means to the second code string received from the second code string provision means; and switching means for switching and outputting the first code string and the code string from the rewriting means in accordance with a predetermined condition;

wherein the code string of the predetermined format comprises a variable-length code string at least partly; and the dummy data comprises dummy data corresponding to at least a part of the variable-length code string.

3. A signal processing device for a code string of a predetermined format obtained by coding a signal, the device comprising:

first code string generation means for generating a first code string by replacing a part of the code string of the predetermined format with dummy data; and second code string generation means for extracting the part of the code string of the predetermined format replaced by the dummy data at the first code string generation means, and generating from the part a second code string for complementing the dummy data part of the first code string;

wherein the code string of the predetermined format can be generated by rewriting the dummy data of the first code string to the second code string and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

4. A signal processing device for a code string of a predetermined format obtained by coding a signal, the device comprising:

first code string generation means for generating a first code string by replacing a part of the code string of the predetermined format with dummy data; and second code string generation means for extracting the part of the code string of the predetermined format replaced by the dummy data at the first code string generation means, and generating from the part a second code string for complementing the dummy data part of the first code string;

wherein the code string of the predetermined format can be generated by rewriting the dummy data of the first code string to the second code string and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

5. The signal processing device as claimed in claim 4, wherein the second code string comprises at least a part of the code string of the predetermined format as dummy data.

6. The signal processing device as claimed in claim 4, wherein in the coding, a code string of the predetermined format comprising spectral coefficient information for each band of an input signal is generated, in the code string of the predetermined format, at least the spectral coefficient information is coded to a variable-length code string, and the dummy data comprises dummy data corresponding to a part of the spectral coefficient information.

7. The signal processing device as claimed in claim 4, wherein a part of the spectral coefficient information is information of a mid frequency band of the spectral coefficient information.

8. The signal processing device as claimed in claim 4, wherein in the coding, a code string of the predetermined format comprising quantization accuracy information for each band of an input signal is generated, and the dummy data further comprises dummy data of at least a part of the quantization accuracy information.

9. The signal processing device as claimed in claim 4, wherein in the coding, a code string of the predetermined format comprising normalization factor information for each band of an input signal is generated, and the dummy data further comprises dummy data of at least a part of the normalization factor information.

10. A signal processing method for a code string of a predetermined format obtained by coding a signal, the method comprising:

a first code string generation step of generating a first code string by replacing a part of the code string of the predetermined format with dummy data; and a second code string generation step of extracting the part of the code string of the predetermined format replaced by the dummy data at the first code string generation step, and generating from the part a second code string for complementing the dummy data part of the first code string;

wherein the code string of the predetermined format can be generated by rewriting the dummy data of the first code string to the second code string and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

11. A signal processing method for a code string of a predetermined format obtained by coding a signal, the method comprising:

a first code string generation step of generating a first code string by replacing a part of the code string of the predetermined format with dummy data; and a second code string generation step of extracting the part of the code string of the predetermined format replaced by the dummy data at the first code string generation step, and generating from the part a second code string for complementing the dummy data part of the first code string;

wherein the code string of the predetermined format can be generated by rewriting the dummy data of the first code string to the second code string and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

12. The signal processing method as claimed in claim 11, wherein the second code string comprises at least a part of the code string of the predetermined format as dummy data.

13. The signal processing method as claimed in claim 11, wherein in the coding, a code string of the predetermined format comprising spectral coefficient information for each band of an input signal is generated, in the code string of the predetermined format, at least the spectral coefficient information is coded to a variable-length code string, and the dummy data comprises dummy data corresponding to a part of the spectral coefficient information.

14. The signal processing method as claimed in claim 11, wherein a part of the spectral coefficient information is information of a mid frequency band of the spectral coefficient information.

15. The signal processing method as claimed in claim 11, wherein in the coding, a code string of the predetermined format comprising quantization accuracy information for each band of an input signal is generated, and the dummy data further comprises dummy data of at least a part of the quantization accuracy information.

16. The signal processing method as claimed in claim 11, wherein in the coding, a code string of the predetermined format comprising normalization factor information for each band of an input signal is generated, and the dummy data further comprises dummy data of at least a part of the normalization factor information.

17. A signal processing device for a code string of a predetermined format obtained by coding a signal, the device comprising:

provision means for providing a first code string in which a part of the code string of the predetermined format is replaced by dummy data;

wherein the code string of the predetermined format can be generated by rewriting the dummy data of the first code string to a second code string for complementing the dummy data part and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

18. A signal processing device for a code string of a predetermined format obtained by coding a signal, the device comprising:

provision means for providing a first code string in which a part of the code string of the predetermined format is replaced by dummy data;

wherein the code string of the predetermined format can be generated by rewriting the dummy data of the first code string to a second code string for complementing the dummy data part and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

19. A signal processing method for a code string of a predetermined format obtained by coding a signal, the method comprising:

a provision step of providing a first code string in which a part of the code string of the predetermined format is replaced by dummy data;

wherein the code string of the predetermined format can be generated by rewriting the dummy data of the first code string to a second code string for complementing the dummy data part and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

20. A signal processing method for a code string of a predetermined format obtained by coding a signal, the method comprising:

a provision step of providing a first code string in which a part of the code string of the predetermined format is replaced by dummy data;

wherein the code string of the predetermined format can be generated by rewriting the dummy data of the first code string to a second code string for complementing the dummy data part and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

21. A signal processing device for a code string of a predetermined format obtained by coding a signal, the device comprising:

provision means for providing a second code string for complementing a dummy data part of a first code string in which a part of the code string of the predetermined format is replaced by dummy data;

wherein the code string of the predetermined format can be generated by rewriting the dummy data of the first code string to the second code string and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

22. A signal processing device for a code string of a predetermined format obtained by coding a signal, the device comprising:

provision means for providing a second code string for complementing a dummy data part of a first code string in which a part of the code string of the predetermined format is replaced by dummy data;

wherein the code string of the predetermined format can be generated by rewriting the dummy data of the first code string to the second code string and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

23. A signal processing method for a code string of a predetermined format obtained by coding a signal, the method comprising:

a provision step of providing a second code string for complementing a dummy data part of a first code string in which a part of the code string of the predetermined format is replaced by dummy data;

wherein the code string of the predetermined format can be generated by rewriting the dummy data of the first code string to the second code string and then switching and outputting the first code string and the code string after the rewriting in accordance with a predetermined condition;

the code string of the predetermined format comprises normalization factor information of the signal; and the dummy data comprises dummy data corresponding to at least a part of the normalization factor information.

24. A signal processing method for a code string of a predetermined format obtained by coding a signal, the method comprising:

a provision step of providing a second code string for complementing a dummy data part of a first code string in which a part of the code string of the predetermined format is replaced by dummy data;

wherein the code string of the predetermined format can be generated by rewriting the dummy data of the first code string to the second code string and then switching and outputting the first code string and the code string after the rewriting in accordance with a predetermined condition;

the code string of the predetermined format comprises a variable-length code string at least partly; and the dummy data comprises dummy data corresponding to at least a part of the variable-length code string.

* * * * *